(12) United States Patent
Nakamura

(10) Patent No.: US 9,201,643 B2
(45) Date of Patent: Dec. 1, 2015

(54) COMMUNICATION SYSTEM, COMMUNICATION METHOD, AND COMMUNICATION APPARATUS

(71) Applicant: Shigeru Nakamura, Kanagawa (JP)

(72) Inventor: Shigeru Nakamura, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/303,982

(22) Filed: Jun. 13, 2014

(65) Prior Publication Data

US 2014/0380299 A1 Dec. 25, 2014

(30) Foreign Application Priority Data

Jun. 19, 2013 (JP) .................. 2013-129035

(51) Int. Cl.
*G06F 9/44* (2006.01)
*G06F 9/445* (2006.01)
*H04L 29/08* (2006.01)

(52) U.S. Cl.
CPC . *G06F 8/65* (2013.01); *H04L 67/10* (2013.01)

(58) Field of Classification Search
CPC ........................................................ G06F 8/65
USPC ........................................................ 717/173
See application file for complete search history.

(56) References Cited

U.S. PATENT DOCUMENTS

| | | | |
|---|---|---|---|
| 6,289,510 B1 | 9/2001 | Nakajima | |
| 8,239,573 B2 * | 8/2012 | Brownrigg, Jr. | ............. 709/241 |
| 2004/0059827 A1 * | 3/2004 | Chiang et al. | ................ 709/235 |
| 2007/0054658 A1 * | 3/2007 | Guyard et al. | ............. 455/414.1 |
| 2010/0050221 A1 * | 2/2010 | McCutchen et al. | .......... 725/109 |
| 2012/0072895 A1 | 3/2012 | Koyama et al. | |
| 2012/0278186 A1 * | 11/2012 | Hayton et al. | ............. 705/14.73 |
| 2013/0019236 A1 | 1/2013 | Nakagawa et al. | |

FOREIGN PATENT DOCUMENTS

| | | |
|---|---|---|
| JP | 2004-348260 | 12/2004 |
| JP | 2011-193264 | 9/2011 |
| JP | 2014-179050 | 9/2014 |

OTHER PUBLICATIONS

U.S. Appl. No. 14/204,043, filed Mar. 11, 2014.

* cited by examiner

*Primary Examiner* — Qing Chen
*Assistant Examiner* — Clint Thatcher
(74) *Attorney, Agent, or Firm* — Oblon, McClelland, Maier & Neustadt, L.L.P.

(57) ABSTRACT

An aspect of an embodiment of the invention provides a communication apparatus for receiving update data for an application, which carries out data communication of transferring data containing at least any one of video data and audio data over a network, and updating the application using the update data. The communication apparatus includes: a receiving unit configured to receive related information that is information related to the update data; an update unit configured to start downloading the update data based on the related information; and a determining unit configured to make determination about an execution state of the application. The update unit controls resumption and suspension of the downloading of the update data based on a result of the determination made by the determining unit.

14 Claims, 17 Drawing Sheets

FIG.9

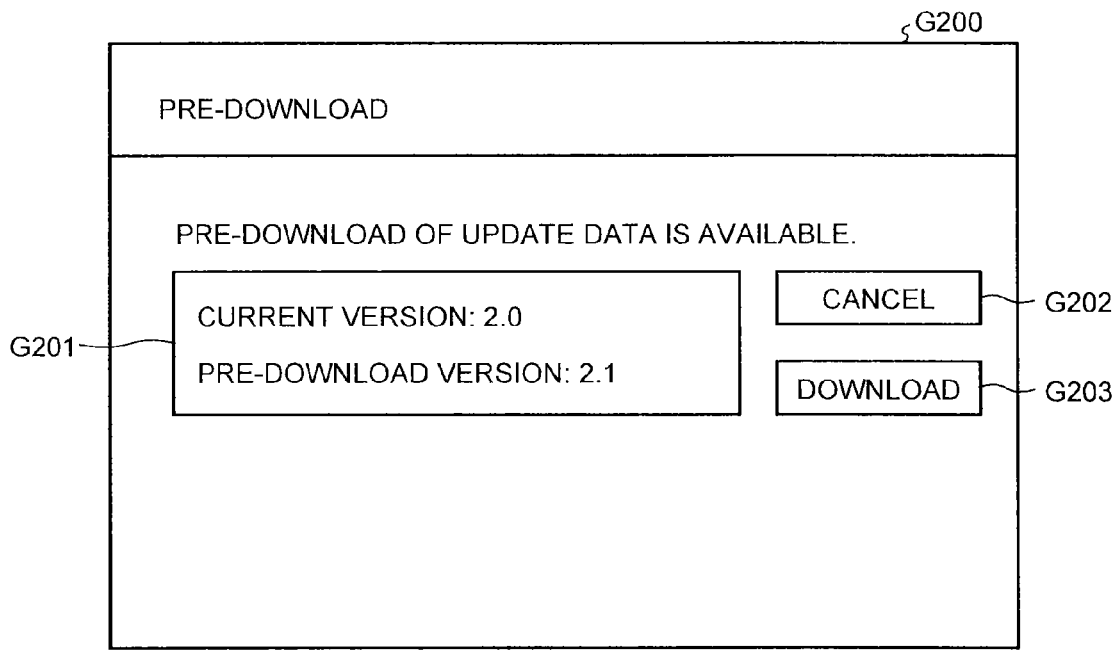

FIG.10

(EXAMPLE OF METADATA)

```
{
  "version": "1.0.1",
  "dependency": "1.0.0",
  "description": "It is sample data.",
  "files": [
    {"src": "https://update.example.jp/1.0.1/NewFile.dll", "sha1sum": "3ab15e931dcd60e5acfeac271bd09d57641611b6"},
    {"src": "https://update.example.jp/1.0.1/NewFirm.exe", "sha1sum": "d296c72aaca0a168e319f5898fda3ee0e3e7d4c8"},
    {"src": "https://update.example.jp/1.0.1/update.dup", "sha1sum": "e709041747e02c181df37d8ddc0a6296b712aaf1"}
  ],
  "scriptname": "update.dup",
  "require_reboot": "true",
  "force_update": "true"
  "valid date": "201209151200"
  "data size": "1954262"
}
```

| MODE | NECESSARY BANDWIDTH | RESOLUTION | FRAME RATE |
|---|---|---|---|
| NARROW BANDWIDTH MODE | 384 kbps | 450 p | 10 kbps |
| MIDDLE BANDWIDTH MODE | 500 kbps | 720 p | 20 kbps |
| WIDE BANDWIDTH MODE | 1000 kbps | 1024 p | 30 kbps |

COMMUNICATION SYSTEM, COMMUNICATION METHOD, AND COMMUNICATION APPARATUS

CROSS-REFERENCE TO RELATED APPLICATIONS

The present application claims priority to and incorporates by reference the entire contents of Japanese Patent Application No. 2013-129035 filed in Japan on Jun. 19, 2013.

BACKGROUND OF THE INVENTION

1. Field of the Invention

The present invention relates generally to a communication system, a communication method, and a communication apparatus.

2. Description of the Related Art

In some communication systems such as video conference systems, firmware (computer program) is regularly updated to enhance confidentiality of calling and operability. Known methods for updating a computer program (hereinafter, "program") in such a communication system include a method of updating the program using update data and metainformation obtained by accessing a server via a network.

Download of update data becomes available generally on or after a date when the update becomes valid. There are known techniques for preventing saturation of communications traffic which can occur if a large number of accesses requesting for download come simultaneously. In one technique for preventing the saturation, a content file which does not function by itself is provided to client machines in advance of scheduled time, and activation data which activates the content file is provided to the client machines on or after the scheduled time.

However, if data communication of transferring data such as image data and/or audio data requiring certain bandwidth is started during a period when the update data is downloaded, quality of the data communication which requires the certain bandwidth can degrade unexpectedly for a user.

In view of the above circumstance, there is a need to provide a communication apparatus, a communication system, and a communication method capable of preventing degradation in quality of data communication.

It is an object of the present invention to at least partially solve the problem in the conventional technology.

SUMMARY OF THE INVENTION

It is an object of the present invention to at least partially solve the problems in the conventional technology.

According to the present invention, there is provided a communication apparatus for receiving update data for an application, the application carrying out data communication of transferring data containing at least any one of video data and audio data over a network, and updating the application using the update data, the communication apparatus comprising: a receiving unit configured to receive related information that is information related to the update data; an update unit configured to start downloading the update data based on the related information; and a determining unit configured to make determination about an execution state of the application, wherein the update unit controls resumption and suspension of the downloading of the update data based on a result of the determination made by the determining unit.

The present invention also provides a communication system comprising: a first communication apparatus configured to receive update data for an application, the application carrying out data communication of transferring data containing at least any one of video data and audio data over a network, and update the application using the update data; and a second communication apparatus configured to transmit the update data and related information, the related information being information related to the update data, to the first communication apparatus, the first communication apparatus including a receiving unit configured to receive the related information, an update unit configured to start downloading the update data based on the related information, and a determining unit configured to make determination about an execution state of the application, wherein the update unit controls resumption and suspension of the downloading of the update data based on a result of the determination made by the determining unit.

The present invention also provides a communication method to be performed in a communication system including a first communication apparatus configured to receive update data for an application, the application carrying out data communication of transferring data containing at least any one of video data and audio data over a network, and update the application using the update data, and a second communication apparatus configured to transmit the update data and related information, the related information being information related to the update data, to the first communication apparatus, the communication method comprising: receiving, by the first communication apparatus, the related information; starting, by the first communication apparatus, downloading of the update data based on the related information; making, by the first communication apparatus, determination about an execution state of the application; and controlling, by the first communication apparatus, resumption and suspension of the downloading of the update data based on a result of the determination made about an execution state.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a conceptual diagram illustrating an example of a pre-download configuration window;

FIG. 10 is a conceptual diagram illustrating an example of related information (metadata);

DETAILED DESCRIPTION OF THE PREFERRED EMBODIMENTS

Exemplary embodiments of the present invention are described in detail below with reference to the accompanying drawings.

Figure 1:
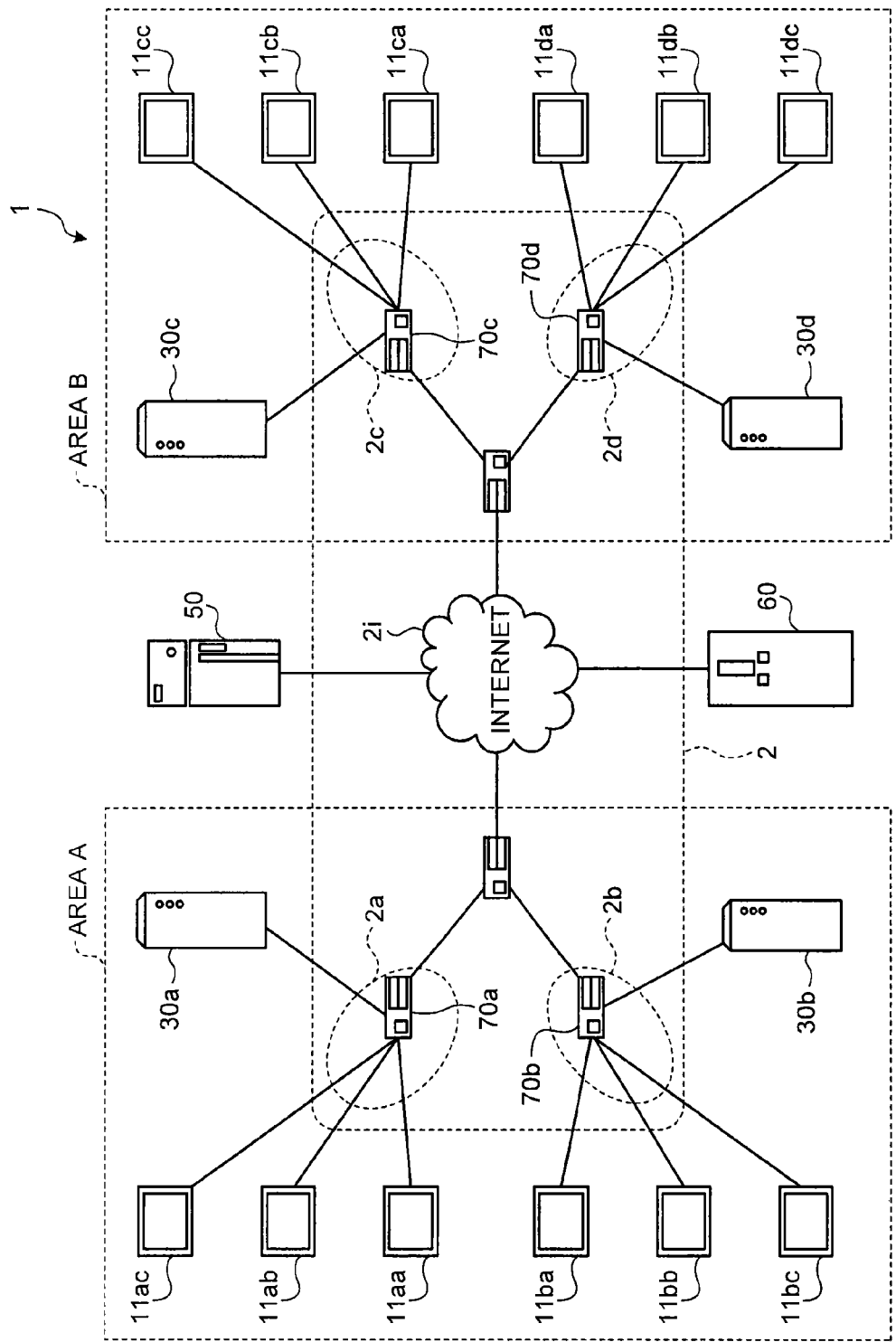
FIG. 1 is a schematic diagram illustrating a configuration of a communication system according to an embodiment of the present invention.

FIG. 1 is a schematic diagram illustrating a configuration of a communication system 1 according to an embodiment of the present invention. As illustrated in FIG. 1, the communication system 1 includes videophone terminals 11aa to 11ac, 11ba to 11bc, 11ca to 11cc, and 11da to 11dc, which serve as communication apparatuses, a communication management server 50, an update server 60, and routers 70a to 70d which are communicably connected to each other via a communication network 2. More specifically, the communication system 1 including the communication management server 50 and the update server 60 includes local area networks (LANs) 2a, 2b, 2c, and 2d, which are connected to Internet denoted by 2i via the routers 70a to 70d, and relay devices 30a, 30b, 30c, and 30d. The videophone terminals 11aa to 11ac and the relay device 30a are connected to the LAN 2a. The videophone terminals 11ba to 11bc and the relay device 30b are connected to the LAN 2b. The videophone terminals 11ca to 11cc and the relay device 30c are connected to the LAN 2c. The videophone terminals 11da to 11dc and the relay device 30d are connected to the LAN 2d. In the communication system 1, each of the videophone terminals 11aa to 11ac and 11ba to 11bc in an area A and the videophone terminals 11ca to 11cc and 11da to 11dc in an areaBtransmits and receives data containing at least any one of audio data and video (image) data to and from each other relayed by the relay devices 30a, 30b, 30c, and 30d under management of the communication management server 50.

More specifically, the communication management server 50 manages information including communication addresses of the videophone terminals 11aa to 11ac, 11ba to 11bc, 11ca to 11cc, and 11da to 11dc, the relay devices 30a, 30b, 30c, and 30d, and the like, information about videophone terminals to be relayed by each of the relay devices 30a, 30b, 30c, and 30d, and call state of the each of videophone terminals. For instance, when a call is to be made from the videophone terminal 11aa to the videophone terminal 11ca, the communication management server 50 requests the relay device 30a to relay the call to the videophone terminal 11ca. The relay device 30a notifies the communication management server 50 that the call from the videophone terminal 11aa is starting and retrieves the communication address of the relay device 30c from the communication management server 50 to relay the call to the videophone terminal 11ca. The relay device 30a then requests the relay device 30c to relay the call to the videophone terminal 11ca. The relay device 30c starts a communication session with the videophone terminal 11ca. The relay device 30c then notifies the communication management server 50 that the communication session with the videophone terminal 11ca is started.

Thus, the call between the videophone terminal 11aa and the videophone terminal 11ca via the relay devices 30a and 30c has started. The communication management server 50 performs management based on call states, which are "on call", of the videophone terminal 11aa and the videophone terminal 11ca. For instance, if the communication management server 50 receives an inquiry about a call state of the videophone terminal 11aa or the videophone terminal 11ca from the videophone terminal 11ab, the communication management server 50 returns a response that the videophone terminal 11aa or the videophone terminal 11ca is "on-line" but "on call".

Where an embodiment uses reference character to refer to one or more of same or analogous elements, the element(s) is denoted by numerical reference from which alphanumeric character following numerical character is omitted. For example, each of the videophone terminals 11aa to 11ac, 11ba to 11bc, 11ca to 11cc, and 11da to 11dc will be referred to generally as "videophone terminal 11". Each of the relay devices 30a to 30d will be referred to generally as "relay device 30".

The update server 60 is an update-data providing apparatus (second communication apparatus) which manages information (hereinafter, "update-related information") related to updates of computer program (hereinafter, "program") and various setting information of each of the videophone terminals (first communication apparatuses) 11, and provides the update-related information according to a request from the videophone terminal 11. Examples of related information, which is the update-related information, include every version of data files, from past to the newest version, of the program and the various setting information of the videophone terminal 11, and metadata sets (metainformation) which describe contents of the updates for each of the versions. Because time when an update is applied to the videophone terminal 11 varies from one to another among the videophone terminals 11, the update server 60 manages every version of the data files as the update-related information. This will be described more specifically below.

For example, although the videophone terminal 11 which is frequently updated may need an update only to the newest version, the videophone terminal 11 after a long update interval may be updated to one or more versions before being updated to the newest version. In such a case as the latter, the videophone terminal 11 may be updated in multiple steps including updating to one or more older versions on which the newest version depends, rather than being updated to the newest version in a single step. Thus, some of the videophone terminals 11 may be updated in multiple steps including updating to one or more older versions on which the newest version depends. For this reason, the update server 60 manages every version of the data files as the update-related information.

Meanwhile, updates can be classified into two types: normal updates and forced updates. The normal update is to be applied to correct an error such as a bug and to add a feature.

The forced update is to be forcibly applied to adapt to a change made to other device than the videophone terminal 11 or other feature than features of the videophone terminal 11. For instance, there may be a case in which a format of audio data or image data, which is to be transferred during calls, or video compression/decompression software of the relay device 30 is changed or a case in which a video-related update, such as an update of an encoder, is applied to the relay device 30. There may be a case in which a communication protocol for use in communication between the videophone terminal 11 and the relay device 30 is changed. Such a change as those described above will: change a structure of audio, image, or video data; change a procedure for carrying out communication with the relay device 30 to adapt to the change in the communication protocol; and/or change a feature of the relay device 30. Unless otherwise updated, the videophone terminal 11 will be incapable of making a call which is a primary function of the videophone terminal 11. Accordingly, in such a case, a forced update is applied to the videophone terminal 11 to adapt to the updated relay device 30.

If a problem in terms of security, such as a security hole, be found in the relay device 30, an update to correct the problem, such as an update to close the security hole, may be applied to the relay device 30. Also in such a case, because the videophone terminal 11 is unusable even in making a call until the videophone terminal 11 is updated, a forced update is applied to the videophone terminal 11 to adapt to the relay device 30 that is updated to close the security hole.

Figure 2:
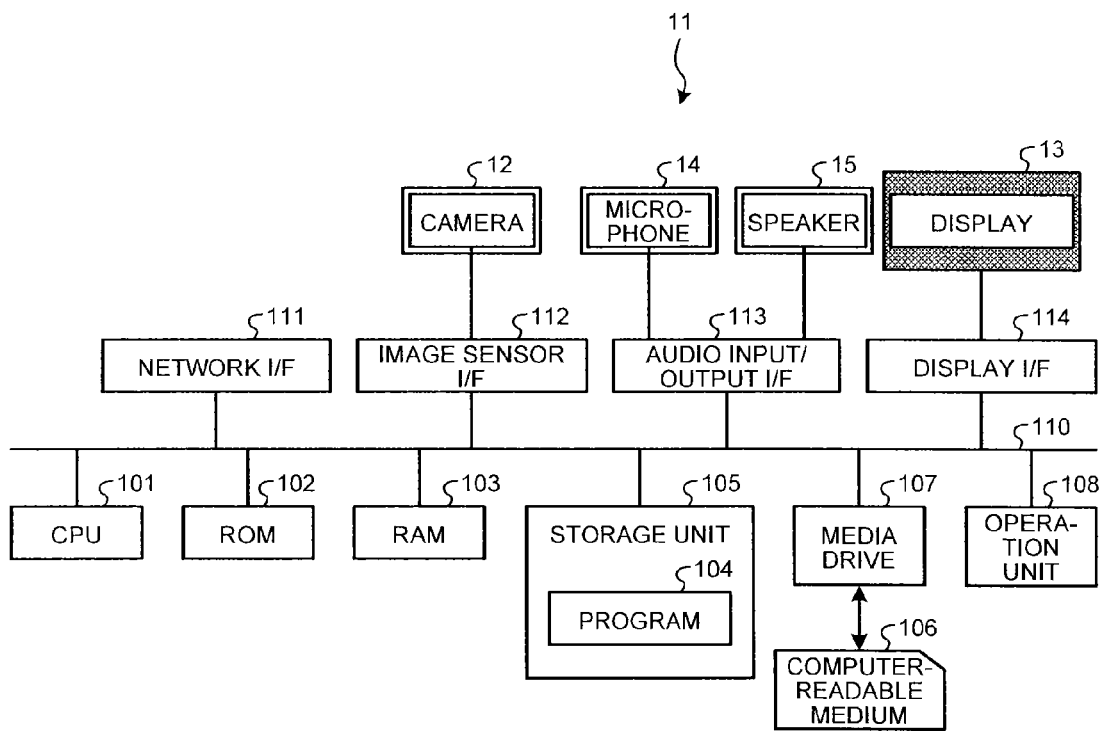
FIG. 2 is a block diagram illustrating an example hardware configuration of a videophone terminal.

A hardware configuration of the videophone terminal 11 is described below. FIG. 2 is a block diagram illustrating an example hardware configuration of the videophone terminal 11. As illustrated in FIG. 2, the videophone terminal 11 includes a central processing unit (CPU) 101, a read only memory (ROM) 102, a random access memory (RAM) 103, a storage unit 105, a media drive 107, an operation unit 108, a network interface (I/F) 111, an image sensor I/F 112, an audio input/output I/F 113, and a display I/F 114, which are connected to each other via a bus 110.

The CPU 101 provides central control of operation of the videophone terminal 11 by loading a program 104 stored in the ROM 102 or the storage unit 105 into the RAM 103 and sequentially executing instructions of the program 104. The storage unit 105, which can be a hard disk drive (HDD) or a solid state drive (SSD), readably and writably stores data. More specifically, the storage unit 105 stores the program 104 to be executed by the CPU 101 and various types of setting information. An update of the videophone terminal 11 is performed by updating the program 104 and the various setting information stored in the storage unit 105.

The media drive 107 is a drive device which reads and writes data from and to a computer-readable medium 106 such as an optical disk. The operation unit 108 may be, for example, a keyboard, various operation keys, and a touch panel arranged on a display 13 in a layered manner and configured to receive commands (operations) input by a user.

The network I/F 111 is an interface connected to the communication network 2 for data communication. The image sensor I/F 112 is an interface connected to a camera 12, which is a digital camera, so that the videophone terminal 11 can obtain an image captured by the camera 12. The audio input/output I/F 113 is an interface connected to a microphone 14 and a speaker 15 so that audio can be input to the videophone terminal 11 from the microphone 14 and audio can be output from the videophone terminal 11 to the speaker 15. The display I/F 114 is an interface connected to the display 13, which can be a liquid crystal display (LCD) for example, so that data to be displayed can be output to the display 13.

In this embodiment, the display 13 is used. Alternatively, another configuration in which other display device, such as a projector, is connected in place of the display 13 may be employed.

The videophone terminal 11 outputs an image captured by the camera 12 and audio fed from the microphone 14 to the relay device 30 through the network I/F 111 under control of the CPU 101 executing the program 104 during a call session with another videophone terminal 11, for example. The videophone terminal 11 also outputs audio, which is fed from another videophone terminal 11 and relayed by the relay device 30 through the network I/F 111, from the speaker 15. The videophone terminal 11 displays an image fed from another videophone terminal 11 on the display 13 in a similar manner. The videophone terminal 11 establishes an audio/image session, or what is referred to as a TV conference, with another videophone terminal 11 in this manner. The videophone terminal 11 may be a communication terminal such as a general-purpose personal computer (PC), a smartphone, a mobile phone, or a tablet PC.

Figure 3:
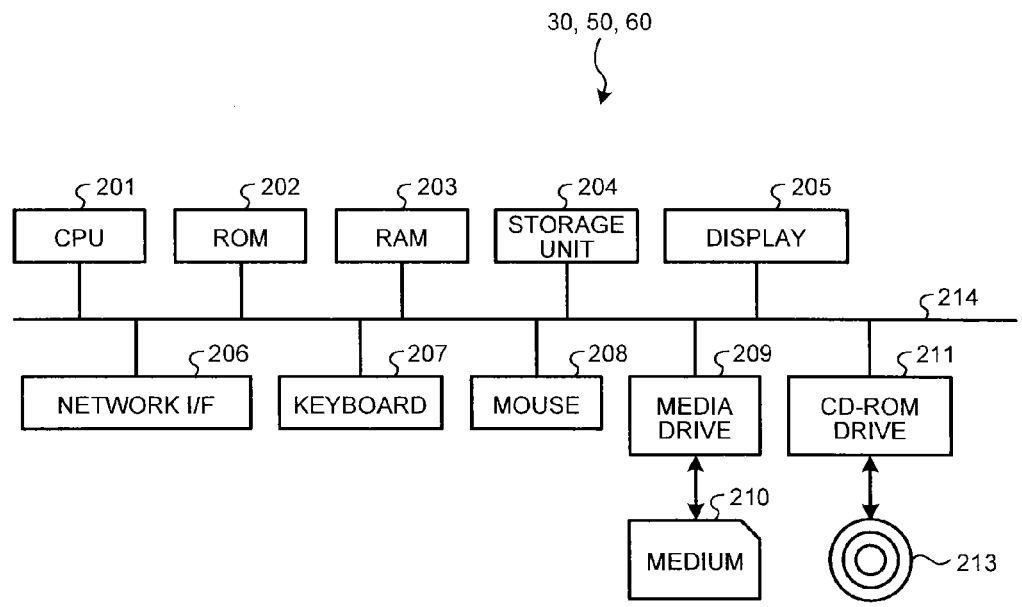
FIG. 3 is a block diagram illustrating an example hardware configuration of a relay device, a communication management server, and an update server.

A hardware configuration of the relay device 30, the communication management server 50, and the update server 60 is described below. FIG. 3 is a block diagram illustrating an example hardware configuration of the relay device 30, the communication management server 50, and the update server 60. Referring to FIG. 3, each of the relay device 30, the communication management server 50, and the update server 60 includes a CPU 201, a ROM 202, a RAM 203, a storage unit 204, a display 205, a network I/F 206, a keyboard 207, a mouse 208, a media drive 209, and a compact disk read-only memory (CD-ROM) drive 211, which are connected to each other via a bus 214. Each of the relay device 30, the communication management server 50, and the update server 60 may be an apparatus such as a personal computer (PC) or a workstation.

In the relay device 30, the communication management server 50, or the update server 60 (hereinafter, sometimes referred to as "the apparatus illustrated in FIG. 3"), the CPU 201 provides central control of operation of the apparatus illustrated in FIG. 3 by loading a program stored in the ROM 202 or the storage unit 204 into the RAM 203 and sequentially executes instructions of the program. The storage unit 204, which can be an HDD or an SSD, readably and writably stores data. For example, in the update server 60, update-related information and the like are stored in the storage unit 204.

The display 205 may be an LCD, for example. The network I/F 206 is an interface connected to the communication network 2 for data communication. The keyboard 207 and the mouse 208 receive commands (operations) input by a user. The media drive 209 is a drive device which reads and writes data from and to a computer-readable medium 210, examples of which include an optical disk. The CD-ROM drive 211 is a drive device which performs reading from a CD-ROM 213. For example, in the update server 60, latest update-related information may be provided by the medium 210 or the CD-ROM 213 and stored in the storage unit 204.

Figure 4:
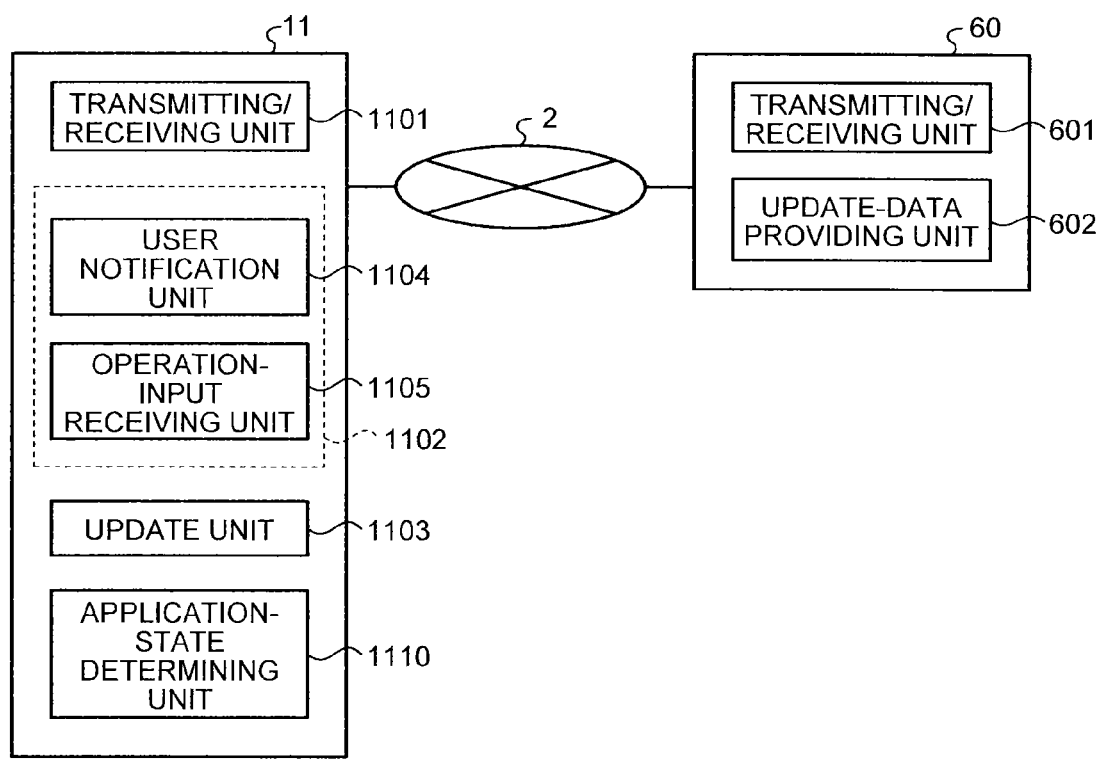
FIG. 4 is a block diagram illustrating a structure of functions of the videophone terminal and the update server of the embodiment.

A structure of functions of the videophone terminal 11 and the update server 60 implemented by the CPU 101 and the CPU 201 through program execution is described below. FIG. 4 is a block diagram illustrating a structure of the functions of the videophone terminal 11 and the update server 60 of the embodiment. As illustrated in FIG. 4, the videophone terminal 11 primarily includes a transmitting/receiving unit 1101, a user interface (UI) unit 1102, an update unit 1103, and an application-state determining unit (determining unit) 1110. The update server 60 primarily includes a transmitting/receiving unit 601 and an update-data providing unit 602. A part or all of each of the functions of the videophone terminal 11 and the update server 60 may be implemented in hardware.

The transmitting/receiving unit 1101 transmits and receives data to and from the update server 60 over the communication network 2. More specifically, the transmitting/receiving unit 1101 transmits and receives data to and from the update server 60 by initiating a communication session according to a predetermined communication protocol using the communication address of the update server 60. The communication address may be contained in the setting information stored in the storage unit 105 in advance or, alternatively, obtained by making an inquiry to the communication management server 50. By carrying out data transmission/reception in this manner, the transmitting/receiving unit 1101 obtains update-related information (including metadata and update data, for example) managed by the update server 60.

The UI unit 1102 is an interface which controls information transmission between a user and the videophone terminal 11 by controlling audio output from the speaker 15, a screen displayed on the display 13, and acceptance of an input entered by the user from the operation unit 108. More specifically, the UI unit 1102 includes a user notification unit 1104, which provides a notification of various types to a user by using audio output from the speaker 15 and a screen displayed on the display 13, and an operation-input receiving unit 1105, which receives an input entered by the user from the operation unit 108.

The update unit 1103 controls and performs updates (including download of update data) of the program 104 and various setting information stored in the storage unit 105 of the videophone terminal 11 based on related information (metadata), which is update-related information sent from the update server 60 and received by the transmitting/receiving unit 1101. Updating to be performed by the update unit 1103 will be described in detail later as an update process (Step S16 in FIG. 6).

The application-state determining unit 1110 determines and manages a startup state or an execution state of, for example, an application program (hereinafter, "application") which provides a video conferencing function. More specifically, for example, the application-state determining unit 1110 determines an application execution state of the videophone terminal 11. Examples of the application execution state include: a state (e.g., a state indicating that a video conference is started) indicating that image-and-audio communication with another one of the videophone terminals 11 is started; a state (e.g., a state indicating that the videophone terminal 11 is in a video conference) indicating that image-and-audio communication is being carried out; and a state (e.g. a state indicating that a video conference has ended) indicating that image-and-audio communication has ended. Furthermore, the application-state determining unit 1110 determines a state of bandwidth available in the communication network 2 and a state of bandwidth necessary to carry out the image-and-audio communication with the other videophone terminal 11. In this embodiment, the "video conference" is used as a term replaceable with the term "TV conference". The "communication" may be communication of only one of image communication and audio communication.

The transmitting/receiving unit 601 transmits and receives data to and from the videophone terminal 11 over the communication network 2. More specifically, the transmitting/receiving unit 601 transmits and receives data to and from the update server 60 by initiating a communication session according to a predetermined communication protocol over the communication network 2 according to a request from the videophone terminal 11.

The update-data providing unit 602 provides update-related information managed by the update server 60 to the videophone terminal 11 according to a request from the videophone terminal 11, in which the transmitting/receiving unit 601 is transmitting and receiving data.

Figure 5:
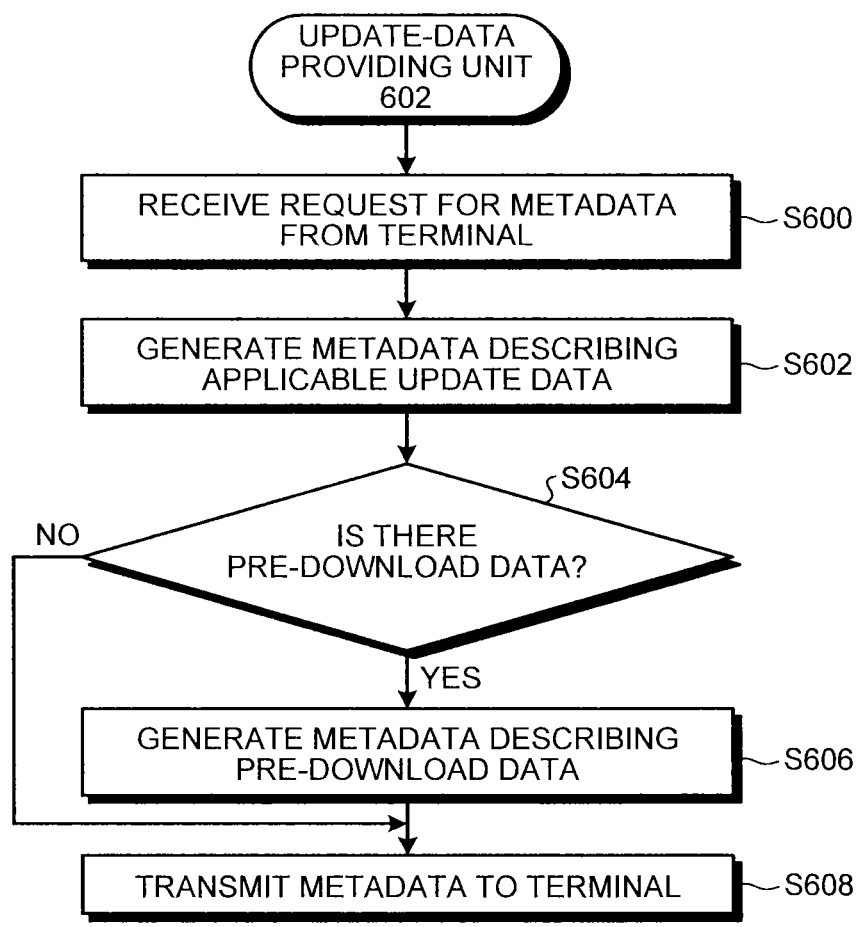
FIG. 5 is a flow diagram illustrating operation of an update-data providing unit.

FIG. 5 is a flow diagram illustrating operation of the update-data providing unit 602. As illustrated in FIG. 5, the update-data providing unit 602 receives a request for metadata from the videophone terminal 11 (Step S600).

Upon receiving the request for metadata, the update-data providing unit 602 generates metadata describing update data (applicable update data) which is currently applicable (Step S602).

The update-data providing unit 602 further determines whether or not there is pre-download data (Step S604). Meanwhile, the "pre-download data" is update data, update with which is currently inapplicable but which is downloadable in advance (earlier than a date when the update becomes valid). More specifically, the "pre-download data" is update data which is downloadable in advance of an update of the application which provides the video conference function, for example. Pre-download allows preventing a disadvantageous situation that a large number of accesses simultaneously come to the update server 60 when the update is released.

The update-data providing unit 602 determines whether or not there is update data which is downloadable in advance by determining whether or not time of "valid date" contained in metadata illustrated in FIG. 10, which will be described later, is later than the current time. The update-data providing unit 602 may obtain the current time from, for example, a network time protocol (NTP) server or, alternatively, from an internal clock.

If the update-data providing unit 602 determines that there is pre-download update data, which is update data downloadable in advance (YES in Step S604), the update-data providing unit 602 generates metadata describing the pre-download update data (Step S606). The update-data providing unit 602 transmits the metadata describing the update data which is currently applicable and the metadata describing the pre-download update data to the videophone terminal 11 (Step S608).

If the update-data providing unit 602 determines that there is no update data which is downloadable in advance (NO in Step S604), the update-data providing unit 602 transmits only the metadata describing the update data which is currently applicable (Step S608).

Figure 6:
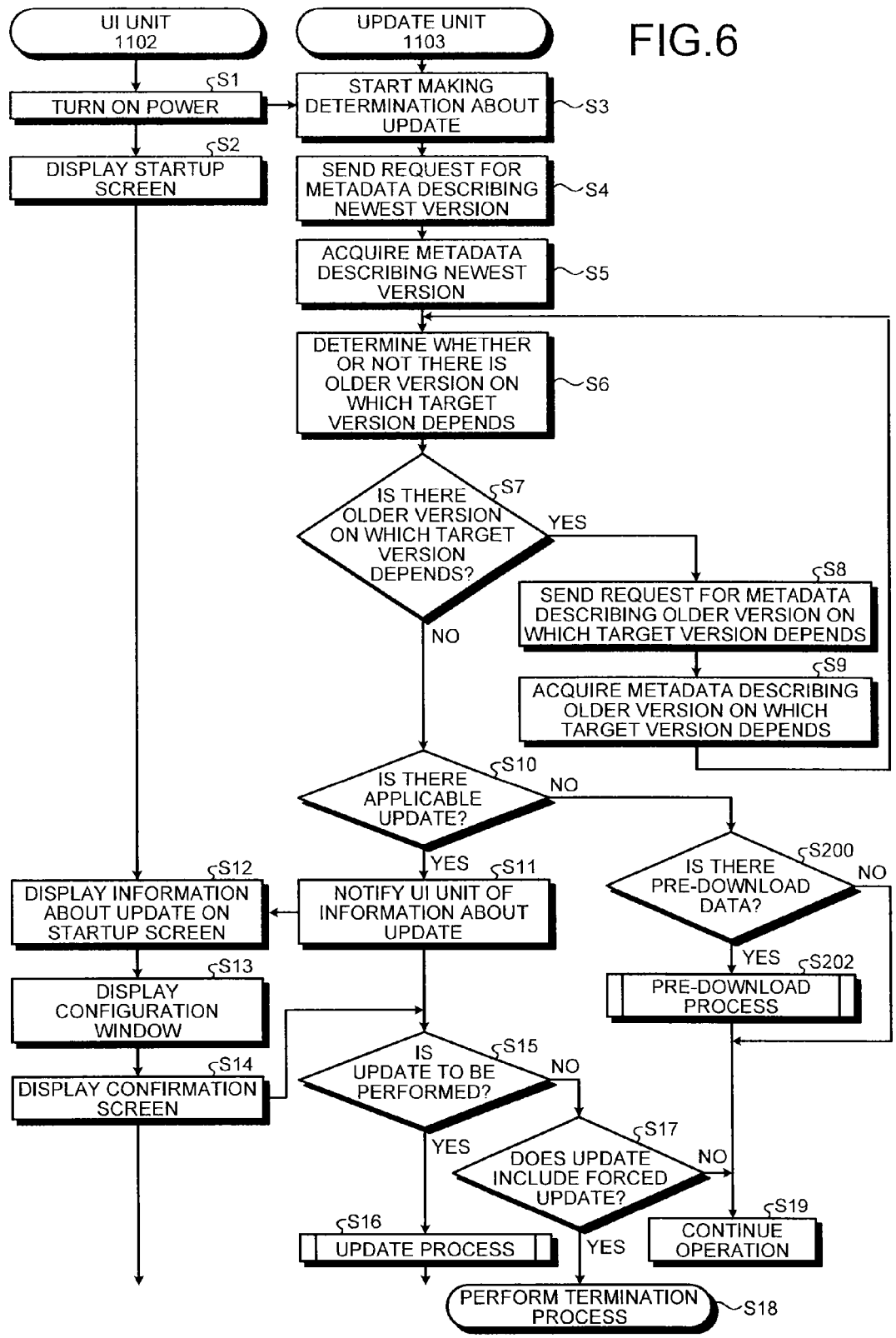
FIG. 6 is a flow ladder diagram illustrating an example operation of the videophone terminal of the embodiment.

Operation of the videophone terminal 11 is described in detail below. FIG. 6 is a flow ladder diagram illustrating an example operation of the videophone terminal 11 of the embodiment.

As illustrated in FIG. 6, the UI unit 1102 switches on power (turns on power) of the videophone terminal 11 in response to an operation of a power switch on the operation unit 108 or the like (Step S1), and causes a startup screen to appear on the display 13 (Step S2). The startup screen is a screen on which a list of call states of all of the videophone terminals 11 is displayed. The call states are obtained by making an inquiry to the communication management server 50 under control of the CPU 101 (which will be described in detail below).

The update unit 1103 starts making determination about update of the videophone terminal 11 on boot-up of the videophone terminal 11 after power-on in Step S1 (Step S3). In the following description, an example in which a program is updated is discussed. However, as a matter of course, the various setting information may be updated in a similar manner.

At start of the determination about update, the update unit 1103 causes the transmitting/receiving unit 1101 to send a request for metadata describing the newest version of the program to the update server 60 (Step S4). As a response to the request, the update unit 1103 obtains the metadata which is provided by the update-data providing unit 602 (Step S5).

The metadata is described in detail below. FIG. 10 is a conceptual diagram illustrating an example of the metadata. Metadata may include information indicating that update data described in the metadata is pre-download data which is downloadable in advance of when an application program is to be updated. As illustrated in FIG. 10, for example, each version of metadata may include metadata elements including "version", "dependency", "description", "files", "scriptname", "require_reboot", "force_update", "valid date", and "data size".

A version number, e.g., "1.0.1", is assigned to "version". A version number, e.g., "1.0.0", of another version, on which the version of the update data depends, is assigned to "dependency". Accordingly, an older version(s) on which the version of the update data depends can be traced by using the version number(s) assigned to "dependency". A description of the version, e.g., "It is sample data.", is assigned to "description". A list of programs (data files) with which updates are to be performed, locations of the data files, and checksums of the data files managed by the update server 60, and the like information are assigned to "files". Accordingly, the update unit 1103 can perform an update to the version described by the metadata by acquiring, using the transmitting/receiving unit 1101, a corresponding data file(s) based on contents of the "files" element. A name of a script to be executed when performing the update is assigned to "scriptname". A flag ("true" or "false") which indicates whether or not to restart the videophone terminal 11 after the update is assigned to "require_reboot". A flag ("true" or "false") indicating whether or not the update is forced update is assigned to "force_update". Date and time from when update data becomes valid (applicable) are assigned to "valid date". Accordingly, "valid date" is information which allows determining whether or not the update data is pre-download data. Size of the update data is assigned to "data size".

Some update of the program 104 is associated with device control such as the network I/F 111, the image sensor I/F 112, the audio input/output I/F 113, and/or the display I/F 114. "True" is assigned to "require_reboot" in metadata describing an update associated with device control. This is because such an update requires a restart after the update. As described above, updates of the program 104 are classified into normal updates and forced updates. "True" is assigned to "force_update" when an update to be performed is a forced update.

Subsequently, the update unit 1103 determines whether or not there is an older version on which a target version depends based on contents of "dependency" in the obtained metadata (Step S6). For instance, as illustrated in FIG. 10, if a version number, e.g, "1.0.0", indicating another version is assigned to the "dependency" element, it is determined that there is an older version on which a target version depends. If no value is assigned to the "dependency" element, it is determined that there is no older version on which the target version depends.

Subsequently, the update unit 1103 determines whether or not there is an older version on which the target version depends after making the determination in Step S6 (Step S7). If there is an older version on which the target version depends (YES in Step S7), the update unit 1103 causes the transmitting/receiving unit 1101 to send a request for metadata describing the older version, on which the target version depends, of the program to the update server 60 (Step S8). The update unit 1103 obtains the metadata describing the older version, on which the target version depends, provided by the update server 60 as a response to the request (Step S9), and causes processing to return to Step S6. Thus, the update unit 1103 traces an older version(s) on which the newest version depends one by one and obtains metadata sets describing the versions.

Subsequently, the update unit 1103 determines whether or not there is any update applicable to the videophone terminal 11 by comparing a version number assigned to "version" in metadata describing the newest version and a version number of the program 104 stored in the storage unit 105 of the videophone terminal 11 (Step S10). More specifically, if the version number of the newest version matches the version number of the program 104, the program 104 is of the newest version. Accordingly, it is determined that there is no applicable update.

On the other hand, if the version number of the newest version does not match the version number of the program 104, the program 104 is an old version. Accordingly, it is determined that there is an applicable update.

If there is no applicable update (NO in Step S10), the update unit 1103 determines whether or not there is pre-download update data, which is update data downloadable in advance (Step S200). The update unit 1103 makes this determination as to whether there is pre-download update data by determining whether or not time of "valid date" in metadata is later than current time.

If there is no pre-download update data (NO in Step S200), neither update nor pre-download needs to be performed. Accordingly, the update unit 1103 causes normal operation to continue (Step S19). If there is pre-download update data (YES in Step S200), the update unit 1103 performs a pre-download process (Step S202), and thereafter causes normal operation to continue (Step S19).

Figure 7:
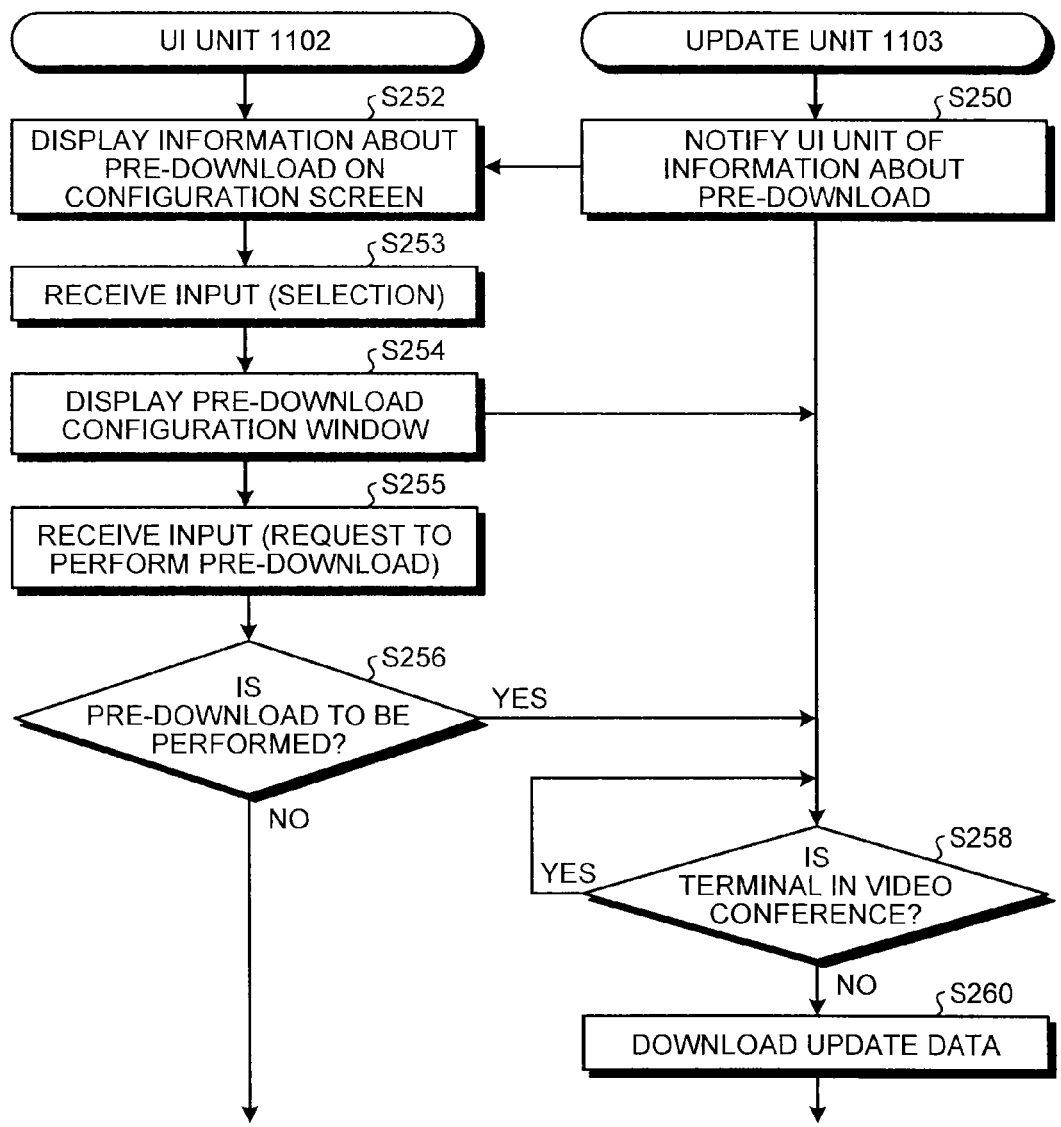
FIG. 7 is a flow ladder diagram illustrating operation of a pre-download process performed by an update unit and a user interface unit.

FIG. 7 is a flow ladder diagram illustrating operation of the pre-download process performed by the update unit 1103 and the UI unit 1102. If there is pre-download update data, the update unit 1103 notifies the UI unit 1102 of information about the pre-download (Step S250).

Figure 8:
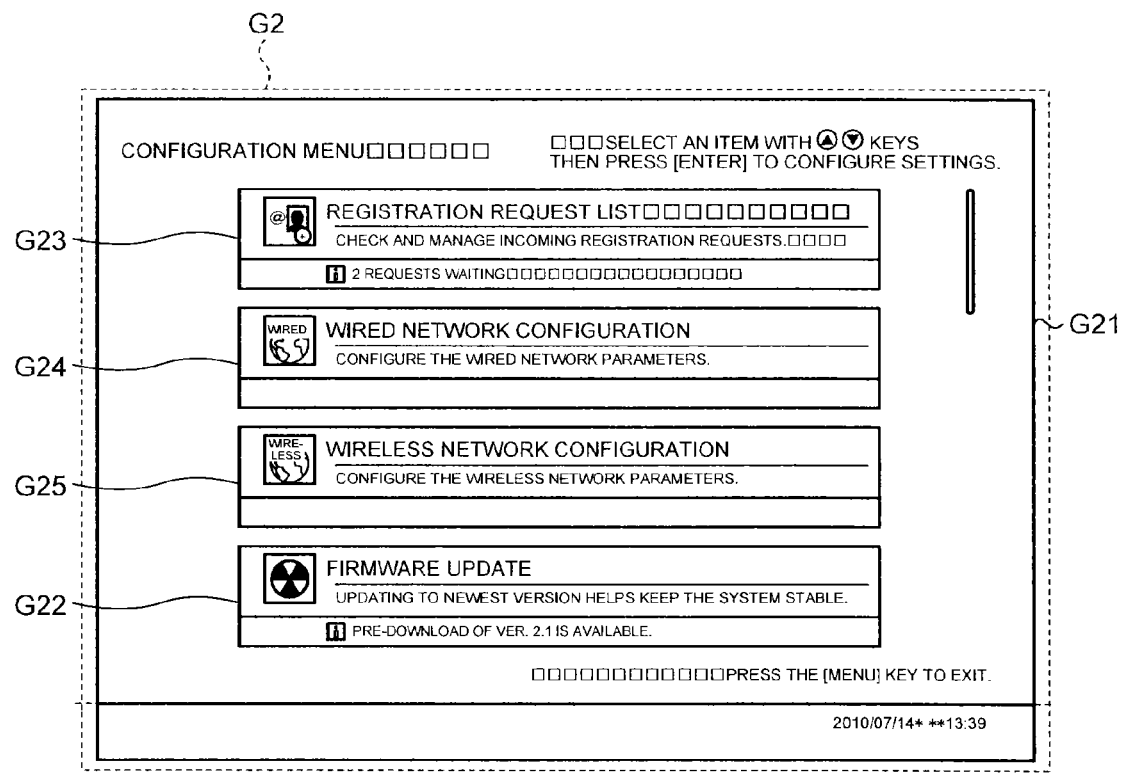
FIG. 8 is a conceptual diagram illustrating an example of a pre-download notification displayed on a configuration screen.

The UI unit 1102 notifies a user that there is pre-download update data by, for example, displaying such a screen as that illustrated in FIG. 8. More specifically, the UI unit 1102 displays the information about the pre-download on a configuration screen G2 (see FIG. 8) (Step S252).

As illustrated in FIG. 8, the configuration screen G2 contains a main window G21 where configuration buttons G22 to G25 are displayed. When configuring various types of settings, a user makes selection from (by operating one of) the configuration buttons G22 to G25, which is received by the operation-input receiving unit 1105. The configuration button G22, which is one of the configuration buttons G22 to G25, is used to issue a command to perform an update. A version number of the newest version, pre-download to which is to be performed, and the like may be displayed on the configuration button G22. The version number can be obtained from the "version" element contained in information about the pre-download. In the example illustrated in FIG. 8, the configuration button G22 contains a notice that pre-download to version 2.1, which is the newest version, is available. The configuration screen G2 may further contain a status pane where a status of the videophone terminal 11 is displayed.

When the UI unit 1102 receives an input which selects one of the configuration buttons G22 to G25 (Step S253), the UI unit 1102 displays such a pre-download configuration window as that illustrated in FIG. 9 (Step S254). A pre-download configuration window G200 illustrated in FIG. 9 contains a pre-download message box G201 and buttons G202 and G203. Description about pre-download update data is displayed in the pre-download message box G201. The buttons G202 and G203 are for use in accepting a command to cancel the pre-download indicated in the pre-download message box G201 and a command to perform the pre-download, respectively, from a user.

When the button G203 for performing pre-download is selected by a user on the pre-download configuration window G200 illustrated in FIG. 9, the UI unit 1102 receives a command to perform pre-download (Step S255). The UI unit 1102 determines whether or not to perform the pre-download based on whether or not a command to perform the pre-download is input by a user (Step S256).

When the UI unit 1102 has received a command to perform the pre-download in Step S255 (YES in Step S256), the update unit 1103 determines whether or not the videophone terminal 11 is currently in a video conference (Step S258). The update unit 1103 determines whether or not the videophone terminal 11 is in a video conference based on a notification about a video conference state fed from the application-state determining unit 1110. Unless otherwise the UI unit 1102 receives a command to perform the pre-download in Step S255 (NO in Step S256), the UI unit 1102 does not allow the pre-download to be performed.

If it is determined that the videophone terminal 11 is in a video conference (YES in Step S258), the update unit 1103 causes processing to continue. In other words, if the videophone terminal 11 is in a video conference, the update unit 1103 does not perform download until the video conference ends.

If it is determined that the videophone terminal 11 is not in a video conference (NO in Step S258), the update unit 1103 downloads update data and stores the downloaded data in the storage unit 105 of the videophone terminal 11 (Step S260).

In the example described above, whether or not to perform pre-download is determined according to user's input. Alternatively, the update unit 1103 may determine whether or not to perform pre-download when there is pre-download data without depending on user's determination. In the example described above, whether or not the videophone terminal 11 is in a video conference is determined in Step S258. Alternatively, the update unit 1103 may be configured to make determination about a data communication state, which is one of "starting", "off line", and "busy", of at least any one of image data and audio data, and control resumption and suspension of the update based on a result of the determination.

Figure 11:
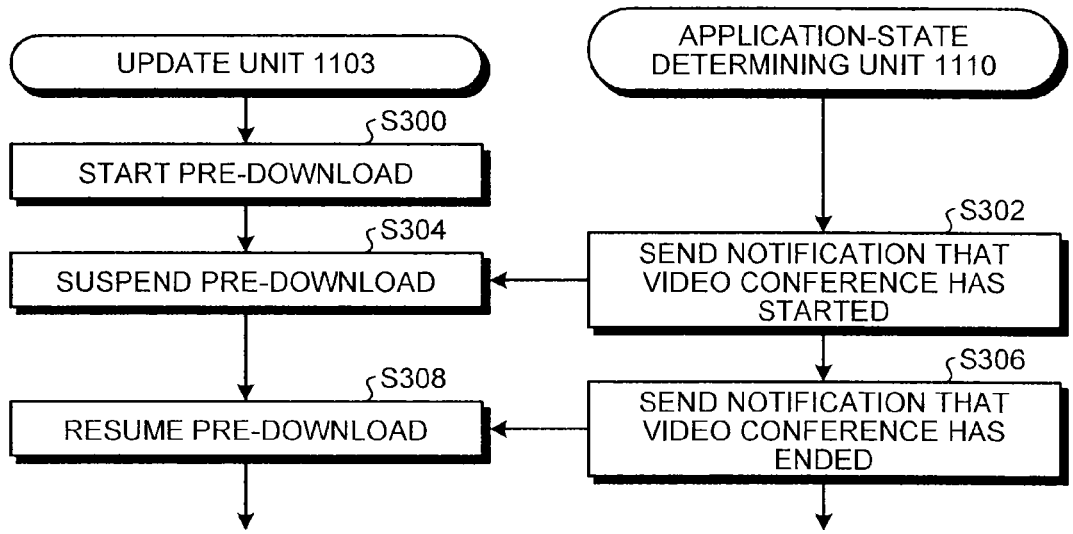
FIG. 11 is a flow ladder diagram illustrating operation of an application-state determining unit and an update unit in a situation where state of a video conference changes during the video conference.

FIG. 11 is a flow ladder diagram illustrating operation of the application-state determining unit 1110 and the update unit 1103 in a situation where state of a video conference changes during the video conference. The update unit 1103 starts pre-download (Step S300). Upon determining that a video conference has started, the application-state determining unit 1110 sends a notification that a video conference has started to the update unit 1103 (Step S302).

If the update unit 1103 receives a notification that application for a video conference or the like has started from the application-state determining unit 1110 during the pre-download, the update unit 1103 suspends the pre-download (Step S304).

Upon determining that the video conference has ended, the application-state determining unit 1110 sends a notification that the video conference has ended to the update unit 1103 (Step S306).

Upon receiving the notification that video conference has ended from the application-state determining unit 1110, the update unit 1103 resumes the pre-download (Step S308). Alternatively, the application-state determining unit 1110 may be configured to make determination about a data communication state, which is one of "starting", "off line", and "busy", of at least any one of image data and audio data, and control the update unit 1103 to resume or suspend the pre-download based on a result of the determination.

Referring back to FIG. 6, if there is an update applicable to the videophone terminal 11 (YES in Step S10), the update unit 1103 notifies the UI unit 1102 of information about the update (Step S11). More specifically, the update unit 1103 sends the elements, such as "files" and "scriptname", of the metadata describing the newest version and of the metadata describing the older version(s), on which the newest version depends, other than elements irrelevant to notification to the user to the UI unit 1102 as the information about the update.

The user notification unit 1104 of the UI unit 1102 provides a notification to the user that there is an update necessary for the videophone terminal 11 by displaying the notification on the startup screen G1 of the display 13 based on the information about the update fed from the update unit 1103 in Step S11 (Step S12).

Figure 12:
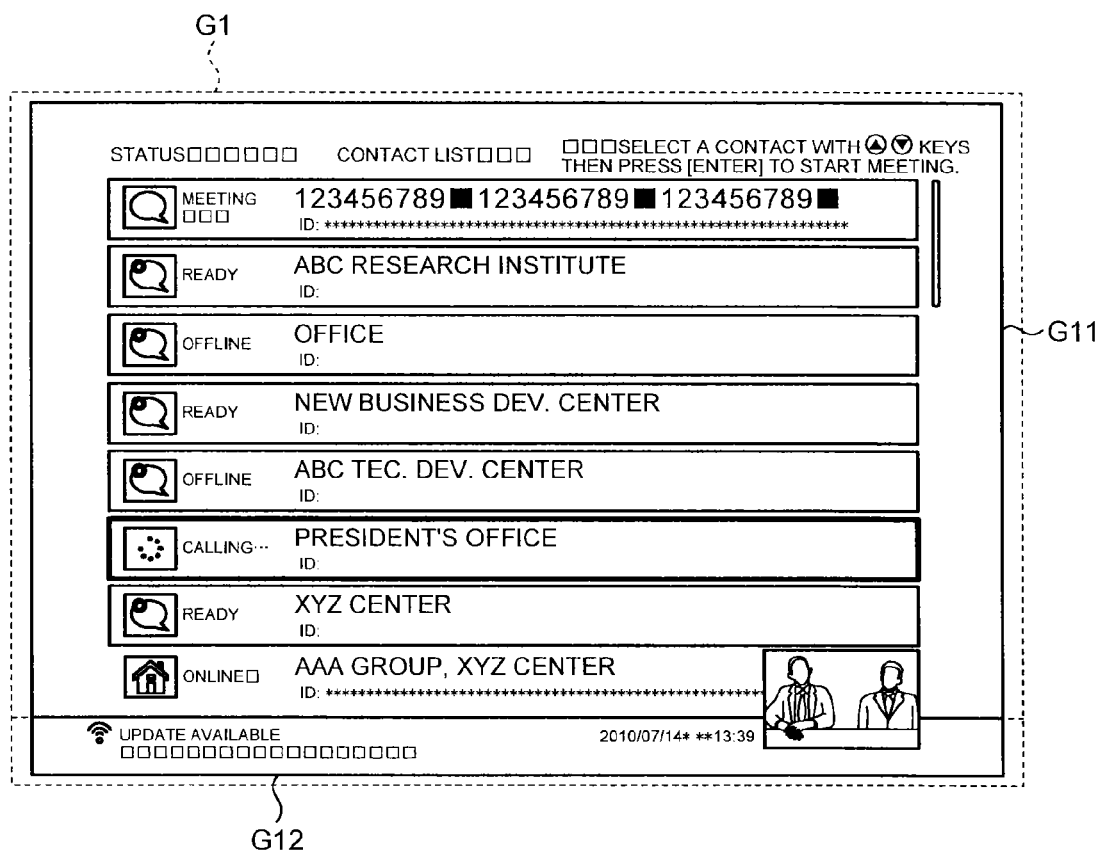
FIG. 12 is a conceptual diagram illustrating an example of a startup screen.

The startup screen G1 is described in detail below. FIG. 12 is a conceptual diagram illustrating an example of a startup screen G1. As illustrated in FIG. 12, the startup screen G1 contains a main window G11 where a list of call states of other videophone terminals is displayed and a status pane G12 where a status of the videophone terminal 11 is displayed. When information about an update is fed from the update unit 1103, the user notification unit 1104 provides a notification to a user by displaying that the update is available on the status pane G12. The location where the notification that there is an available update is displayed is not limited to that illustrated in FIG. 12. Alternatively, a preset icon image may be displayed on the main window G11 to provide the notification. In the illustrated example screens (FIGS. 8, 9, 12 through 15, 17, and 18), each of areas, e.g., system-reserved message display areas, where a message can be displayed is indicated as a region in an outlined rectangular region or a solid rectangular region.

If "true" is assigned to the "force_update" element in the information about the update, the user notification unit 1104 provides a notification to the user that the update data applicable to the videophone terminal 11 is forced update by displaying the notification on the startup screen G1. More specifically, the user notification unit 1104 may display a notification that an applicable update is forced update on the status pane G12 or, alternatively, may dim the list displayed on the main window G11 to indicate that any other operation than applying the update is disabled.

If a command (operation) to configure various settings about an update or the like is input by the user as a response to the notification provided to the user in Step S12 and accepted by the operation-input receiving unit 1105, the UI unit 1102 displays the configuration window G2 on the display 13 (Step S13).

Figure 13:
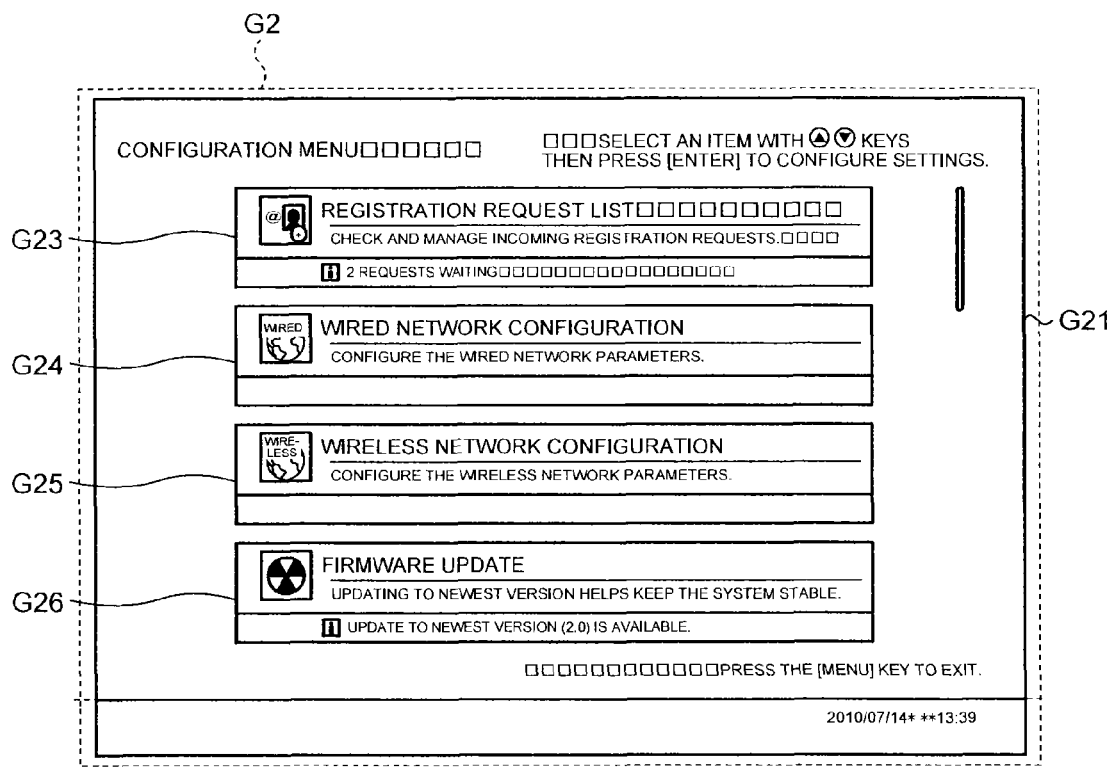
FIG. 13 is a conceptual diagram illustrating an example of the configuration screen.

FIG. 13 is a conceptual diagram illustrating an example of the configuration screen G2. As illustrated in FIG. 13, the configuration screen G2 contains the main window G21 where the configuration buttons G23 to G25 and a configuration button G26 are displayed. When configuring various types of settings, a user makes selection from (by operating one of) the configuration buttons G23 to G26, which is received by the operation-input receiving unit 1105. The configuration button G26, which is one of the configuration buttons G23 to G26, is used to issue a command to perform an update. Selection using the configuration button G26 is disabled by, for example, dimming the button G26 over a period when no information about an update is sent from the update unit 1103 and, accordingly, there is no update applicable to the videophone terminal 11. On the other hand, dimming of the button G26 is canceled when information about an update is sent from the update unit 1103 and, accordingly, there is an update applicable to the videophone terminal 11 to enable a user to select and operate the configuration button G26. In this case, a version number of the newest version, update to which is to be performed, and the like may be displayed on the configuration button G26. The version number can be obtained from the "version" element which is contained in the information about the update. In the example illustrated in FIG. 13, the configuration button G26 contains a notice that an update to version 2.0, which is the newest version, is available. The configuration screen G2 may further contain a status pane where a status of the videophone terminal 11 is displayed.

If the configuration button G26 is selected and operated by the user in Step S13, the UI unit 1102 displays a confirmation screen G3 on the display 13 (Step S14).

Figure 14:
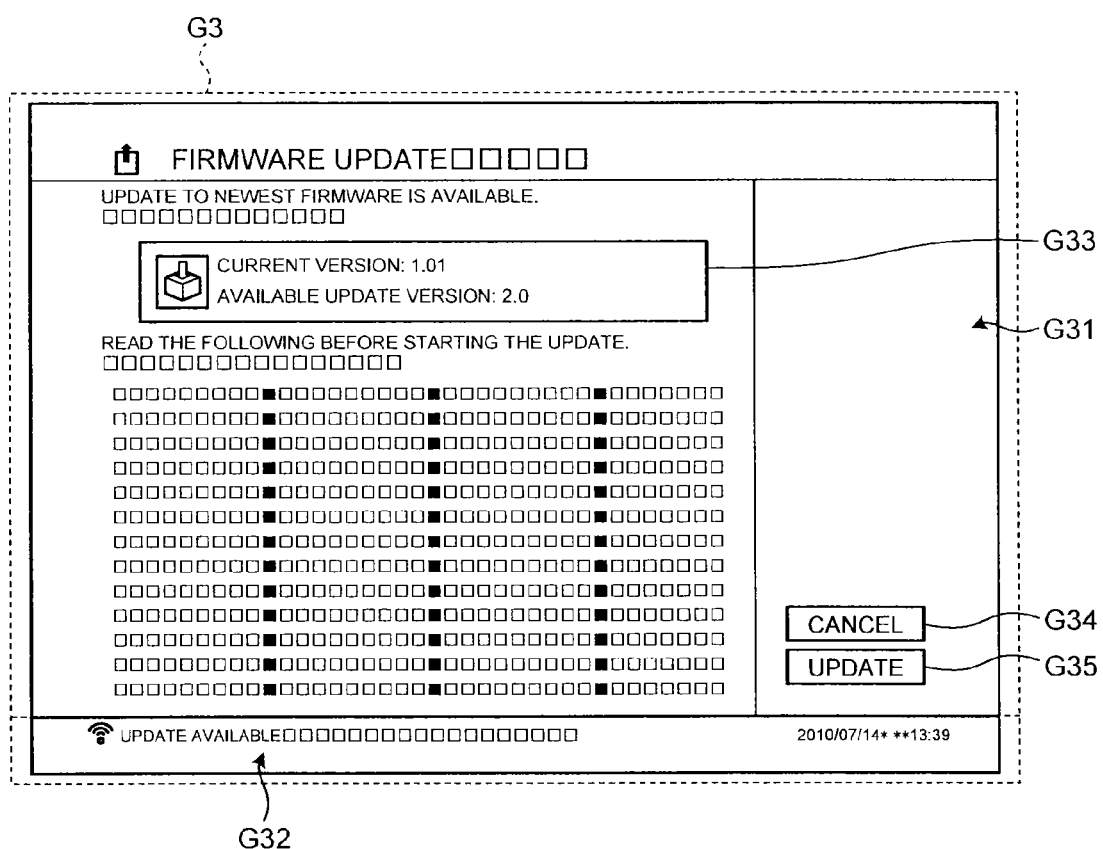
FIG. 14 is a conceptual diagram illustrating an example of a confirmation screen.

FIG. 14 is a conceptual diagram illustrating an example of a confirmation screen G3. As illustrated in FIG. 14, the confirmation screen G3 contains a main window G31 and a status pane G32. The main window G31 contains an update message box G33 and buttons G34 and G35. Description about an update to be performed is displayed in the update message box G33. The buttons G34 and G35 are used by a user to issue a command to cancel the update indicated in the update message box G33 and a command to perform the update, respectively. A status of the videophone terminal 11 is displayed in the status pane G32. Information such as a current version, which is the version number of the program 104 of the videophone terminal 11, and a version number of the newest version, update to which is to be performed, is displayed on the update message box 33 to notify the user of the information. The version number of the newest version can be obtained from the "version" element contained in the information about the update. The information displayed in the update message box G33 allows the user to know to which version the update is to be performed. The update message box G33 on the confirmation screen G3 may be configured to further display information as to whether or not the videophone terminal 11 is to be restarted.

Figure 15:
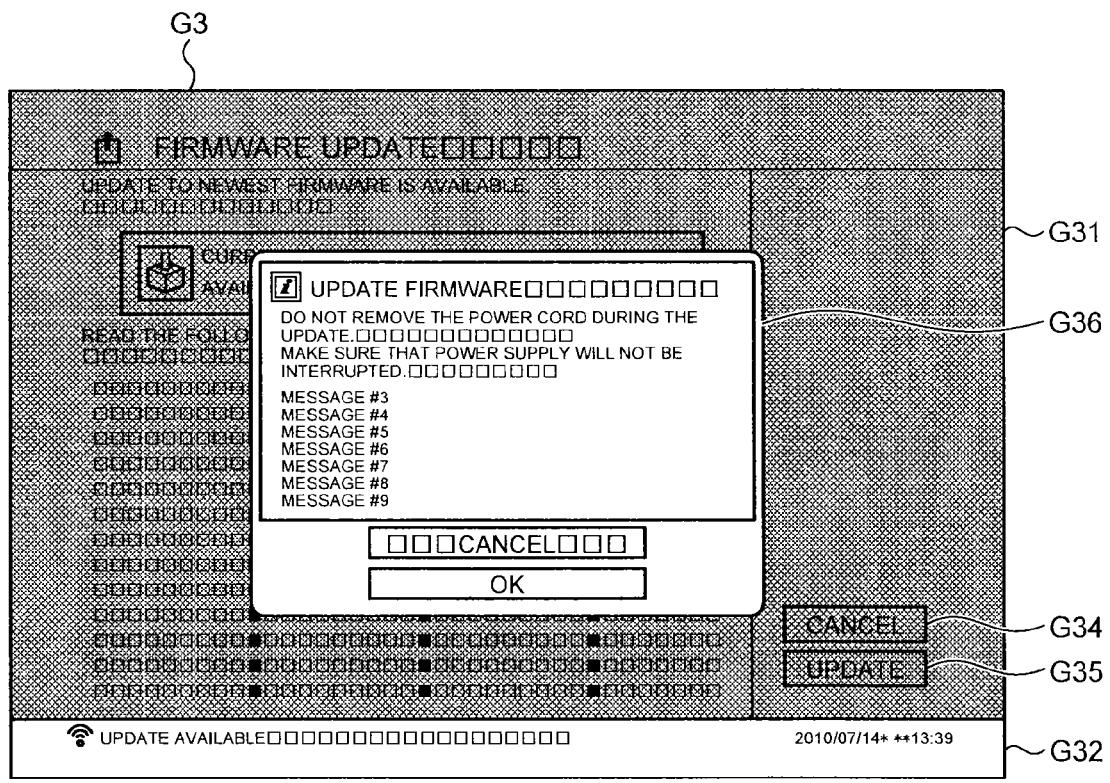
FIG. 15 is a conceptual diagram illustrating an example of a confirmation window.

FIG. 15 is a conceptual diagram illustrating an example of a confirmation window G36. When the button G35 is selected by a user to issue a command to perform the update, the confirmation screen G3 may further display the confirmation window G36 which prompts the user to confirm the selection. The confirmation window G36 may preferably be configured to display information including the version number of the newest version, update to which is to be performed, preset cautions in performing an update, and the like. The confirmation screen G3 can call user's attention by displaying the confirmation window G36 when the command to perform an update is issued. The confirmation window G36 may be configured to further display information as to whether or not the videophone terminal 11 is to be restarted.

Referring back to FIG. 6, the update unit 1103 determines whether or not to perform the forced update based on the selection made using the button G34 or G35 on the confirmation screen G3 (Step S15). When the button G35 is selected to issue the command to perform the update (YES in Step S15), the update unit 1103 perform an update process according to the obtained metadata (Step S16).

If the button G35 is not selected as in a case where the button G34 is selected to cancel the update (NO in Step S15), the update unit 1103 determines whether or not the canceled update includes a forced update based on "force_update" of the obtained metadata (Step S17). If the canceled update includes a forced update (YES in Step S17), the update unit 1103 performs a termination process of terminating the process of the videophone terminal 11 (Step S18) and powers off the videophone terminal 11. Thus, the videophone terminal 11 is configured to power off the videophone terminal 11 in a case where a forced update is not applied, thereby preventing vain attempts to perform an operation. This is because the videophone terminal 11 is unusable even in making a call until the forced update is applied. On the other hand, if the update includes no forced update (NO in Step S17), the update unit 1103 causes normal operation to continue because the update unit 1103 suspends the update. This configuration allows a user to give a higher priority to calling than to the update.

More specifically, the videophone terminal 11 operates as follows. If there is an update applicable to the videophone terminal 11, the user notification unit 1104 of the UI unit 1102 notifies the user of the update. The operation-input receiving unit 1105 of the videophone terminal 11 receives an input which selects whether or not to perform the update from the user. If a selection to perform the update is made by the user, the update unit 1103 performs the update process. Thus, the videophone terminal 11 is configured to allow, if there is an update applicable to the videophone terminal 11, a user to determine whether or not to perform the update.

Figure 16:
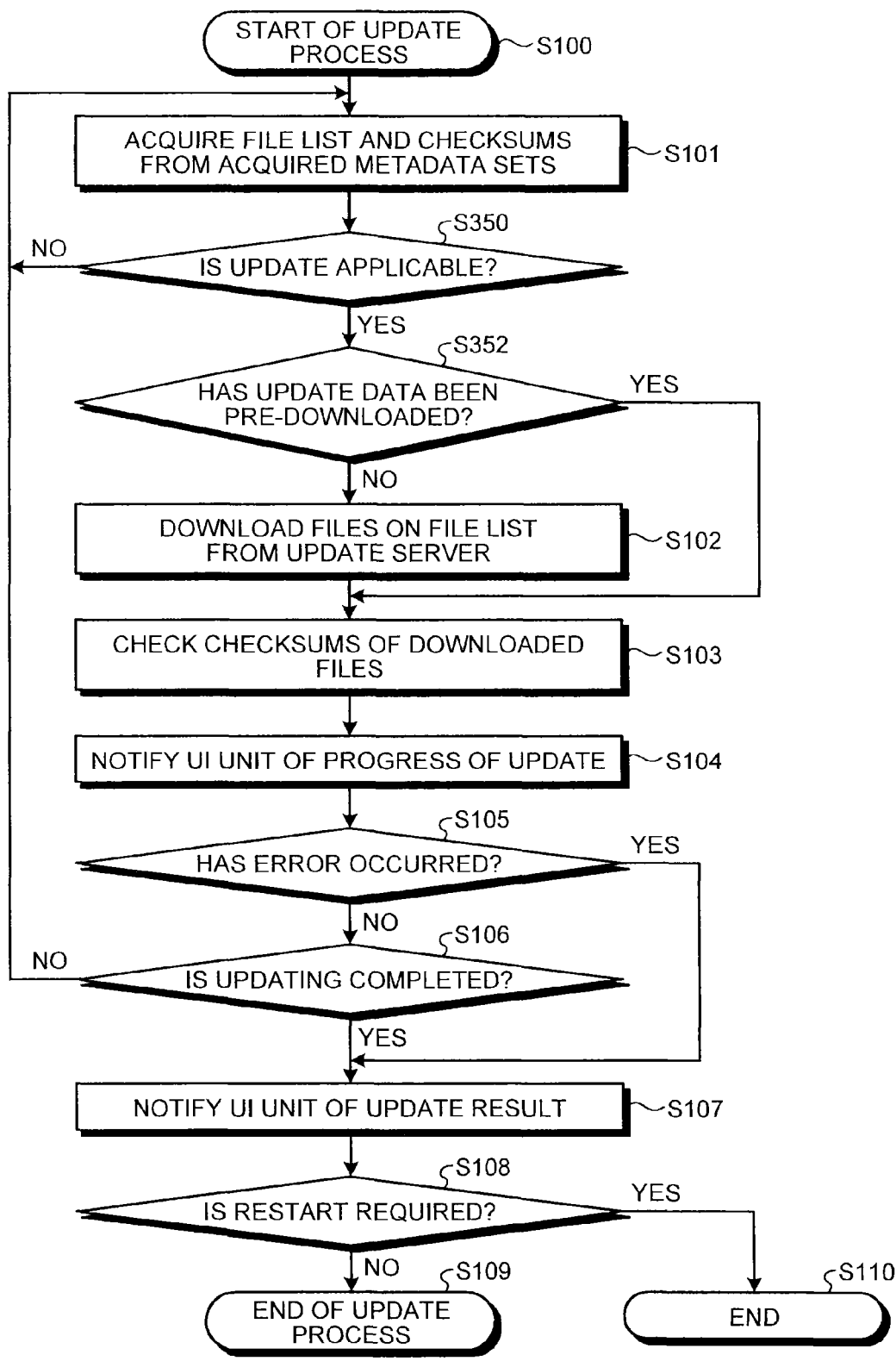
FIG. 16 is a flow diagram illustrating an example of an update process.

The update process (Step S16) is described in detail below. FIG. 16 is a flow diagram illustrating an example of the update process to be performed by the videophone terminal 11.

As illustrated in FIG. 16, at start of the update process (Step S100), the update unit 1103 disables interface units such as the image sensor I/F 112 and the audio input/output I/F 113 which interface between the videophone terminal 11 and external devices such as the camera 12, the microphone 14, and the speaker 15. The interface units are disabled because, if one of the interface units should be operating, the program 104 associated with the interface unit becomes active, which can result in an error of the update. To prevent occurrence of such an error, the update unit 1103 disables the interface units described above at start of the update process.

Subsequently, the update unit 1103 obtains the list of programs (data files), which are the update data, and checksums of the files from "files" of all of obtained metadata sets (Step S101). In a case where metadata sets of plural dependent versions have been obtained, processing from Step S101 to Step S106 is repeatedly performed in an ascending order of version numbers of the versions.

Subsequently, the update unit 1103 determines whether or not the update is applicable based on "valid date" in the metadata (Step S350). For example, the update unit 1103 compares time assigned to "valid date" with current time, which is obtained by the terminal 11 from the NTP server. The update unit 1103 determines that the update is applicable if "valid date" is earlier than the current time.

If the update unit 1103 determines that the update is inapplicable (NO in Step S350), the update unit 1103 causes processing to return to Step S101. If the update unit 1103 determines that the update is applicable (YES in Step S350), the update unit 1103 determines whether or not the update data has been pre-downloaded (Step S352).

If the update data has been pre-downloaded (YES in Step S352), the update unit 1103 checks checksum of every downloaded file (downloaded update data) (Step S103). If the update data has not been pre-downloaded (NO in Step S352), the update unit 1103 downloads files on the file list from the update server 60 (Step S102) and checks checksums of the downloaded files (Step S103).

Subsequently, the update unit 1103 notifies the UI unit 1102 of progress of the update (Step S104). The progress is notified by reporting which file(s) of the plural files on the file list has been processed through Steps S102 and S103. In a case where an update to be performed includes updates to plural versions, the progress may be notified by reporting a version update to which is completed. The UI unit 1102 notifies the user of the progress of the update by displaying the notified progress on the display 13.

Figure 17:
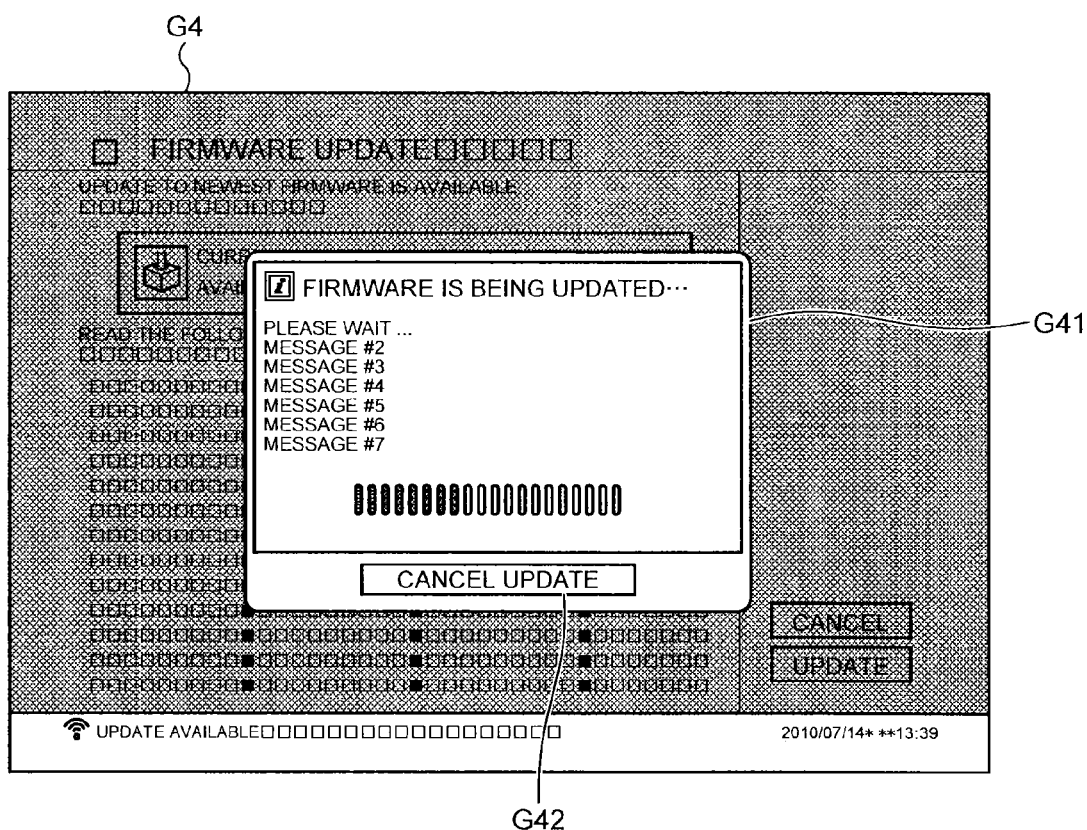
FIG. 17 is a conceptual diagram illustrating an example of an update status window.

FIG. 17 is a conceptual diagram illustrating an example of an update screen G4. The update screen G4 is displayed by the UI unit 1102 during the update process performed by the update unit 1103. As illustrated in FIG. 17, an update status window G41 where the progress of the update notified from the update unit 1103 and a button G42 for use in issuing a command to cancel the update are displayed on the update screen G4. The update status window G41 allows the user to monitor the progress of the update.

The update screen G4 may be configured to further display a remaining-time counter of the update or current line speed in real time. When configured as such, the update screen G4 advantageously allows the user to monitor the update status in more detail.

Subsequently, the update unit 1103 determines whether or not an error has occurred (Step S105). If an error has occurred (YES in Step S105), the update unit 1103 causes processing to proceed to Step S107 to exit from a loop of Steps S101 through S106. Errors to be detected in Step S105 are not limited only to errors (e.g., discrepancy between an original checksum and the checksum acquired at the checksum check in Step S103) caused by some factor during the update. A situation where the update is canceled using the button G42 on the update screen G4 or a situation where a restart is required by one of versions, updates to which are performed through repetition of Steps S102 and S103, is also determined as an error in Step S105. Accordingly, in a case where an update including plural updates, which are applied in an ascending order of version numbers, is to be performed, processing exits from the loop of Steps S101 through S106 at completion of updating to version which requires a restart.

If no error has occurred (NO in Step S105), the update unit 1103 determines whether or not updating to all the versions described in the obtained metadata sets is completed (Step S106). If updating to all the versions is not completed (NO in Step S106), the update unit 1103 causes processing to return to Step S101 to continue the update process. If updating to all the versions is completed (YES in Step S106), the update unit 1103 causes processing to proceed to Step S107 to exit from the loop of Steps S101 through S106.

In Step S107, the update unit 1103 notifies the UI unit 1102 of a result of the update of Steps S101 to S106. The UI unit 1102 notifies the user of the result of the update by displaying the result on the display 13.

Figure 18:
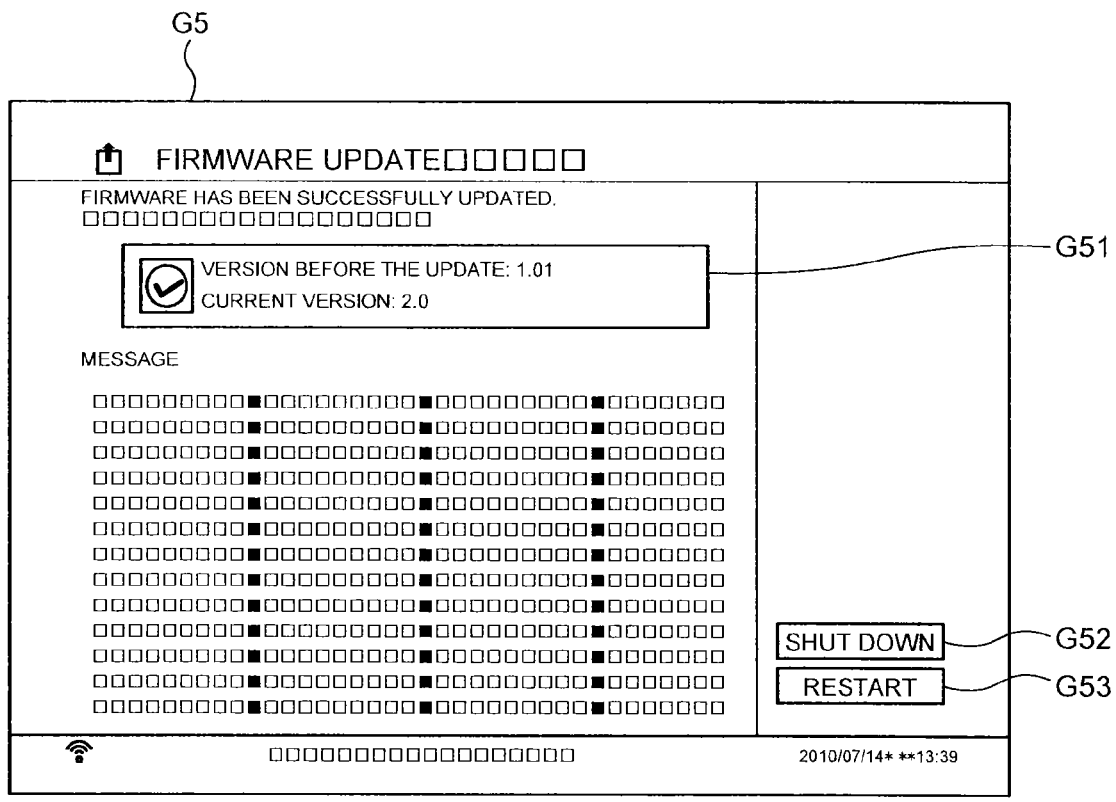
FIG. 18 is a conceptual diagram illustrating an example of a confirmation window.

FIG. 18 is a conceptual diagram illustrating an example of a confirmation screen G5. Upon receiving the result of the update, the UI unit 1102 displays an update result box G51 where the result of the update performed in Steps S101 to S106 is displayed and buttons G52 and G53 on the confirmation screen G5 as illustrated in FIG. 18. The buttons G52 and G53 are for receiving a user command to shut down the videophone terminal 11 and a user command to restart the same, respectively. Information about a pre-update version, information about the current version, updating to which has been performed through Steps S101 to S106, and the like are displayed in the update result box G51. The update result box G51 allows the user to view the result of the update.

Subsequently, the update unit 1103 determines whether or not a restart is required based on contents of "require_reboot" in the metadata used in the update performed through Steps S101 to S106 (Step S108). If a restart is not required (NO in Step S108), the update unit 1103 terminates the update process without a restart (Step S109). If a restart is required (YES in Step S108), the update unit 1103 causes the videophone terminal 11 to restart to terminate the process (Step S110). Thus, in a case where an update which requires a restart is applied, the videophone terminal 11 is automatically restarted after the update.

In this embodiment, resumption and suspension of downloading of update data are controlled in this manner. Accordingly, even if data communication is started during a period when update data is downloaded, degradation in quality of the data communication unexpectedly for a user can be prevented.

First Modification

Figure 19:
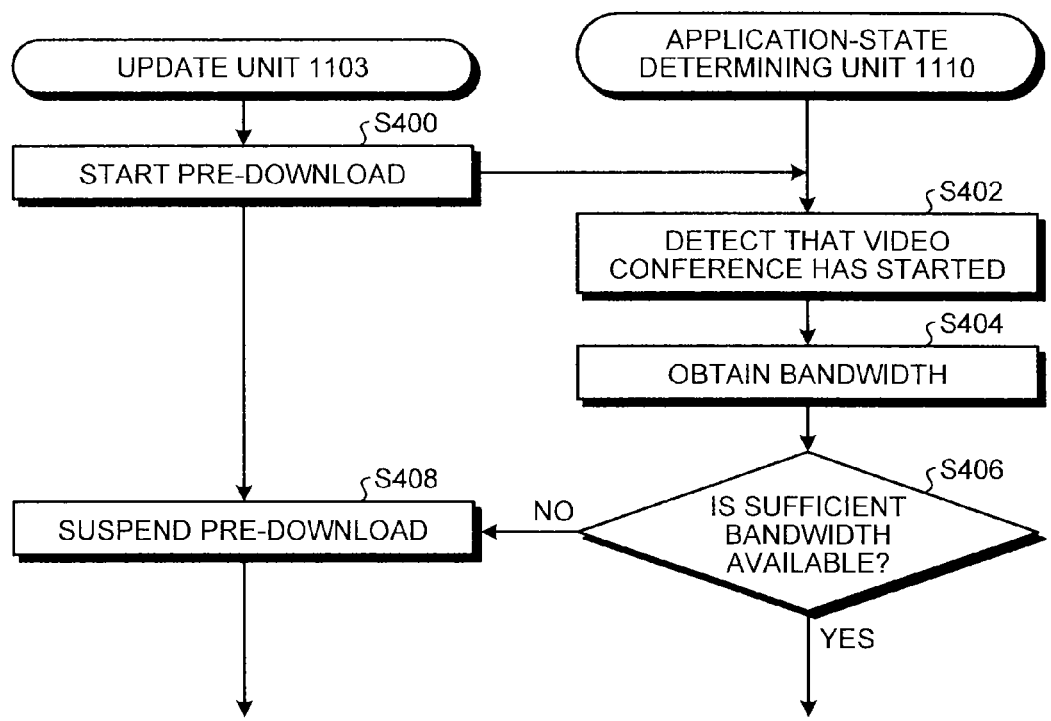
FIG. 19 is a flow ladder diagram illustrating a first modification of the operation of the application-state determining unit and the update unit in a situation where state of a video conference changes during the video conference.

A first modification of the operation of the application-state determining unit 1110 and the update unit 1103 in a situation where state of a video conference changes during the video conference is described below. FIG. 19 is a flow ladder diagram illustrating the first modification of the operation of the application-state determining unit 1110 and the update unit 1103 in a situation where state of a video conference changes during the video conference. The update unit 1103 starts pre-download (Step S400), and notifies the application-state determining unit 1110 that the pre-download has started.

If the application-state determining unit 1110 detects that a video conference has started (Step S402), the application-state determining unit 1110 obtains information about a bandwidth (hereinafter, referred to simply as "obtain the bandwidth") available in the communication network 2 (Step S404). The application-state determining unit 1110 may obtain the available bandwidth using Packet InterNet Groper (Ping). In a case where communication, such as a video conference, is to be established over the communication network 2, the application-state determining unit 1110 may obtain the available bandwidth by detecting a speed of communication being carried out. The application-state determining unit 1110 may obtain the available bandwidth by constant polling. The application-state determining unit 1110 may be configured to make a determination about a data communication state, which is one of "starting", "off line", and "busy", of at least any one of image data and audio data, and control the update unit 1103 to resume or suspend the pre-download according to the result of determination.

The application-state determining unit 1110 determines whether or not a bandwidth sufficient to carry out a video conference is available in the communication network 2 by comparing the obtained available bandwidth against a threshold value which is set in advance for video conference (Step S406). The threshold value may preferably be set according to a communication quality desired by a user. For example, the application-state determining unit 1110 may store the threshold value, e.g., "1 megabits per second (Mbps)", in a form of a configuration file in a memory.

If the bandwidth is lower than the threshold value (NO in Step S406), the application-state determining unit 1110 issues a command to suspend the pre-download to the update unit 1103. If the bandwidth is equal to or greater than the threshold value (i.e., the sufficient bandwidth is available) (YES in Step S406), the application-state determining unit 1110 does not issue the command to the update unit 1103. In short, if the bandwidth is equal to or greater than the threshold value, the update unit 1103 continues the pre-download.

Upon receiving the command to suspend the pre-download, the update unit 1103 suspends the pre-download (Step S408).

Second Modification

Figures 20, 21:
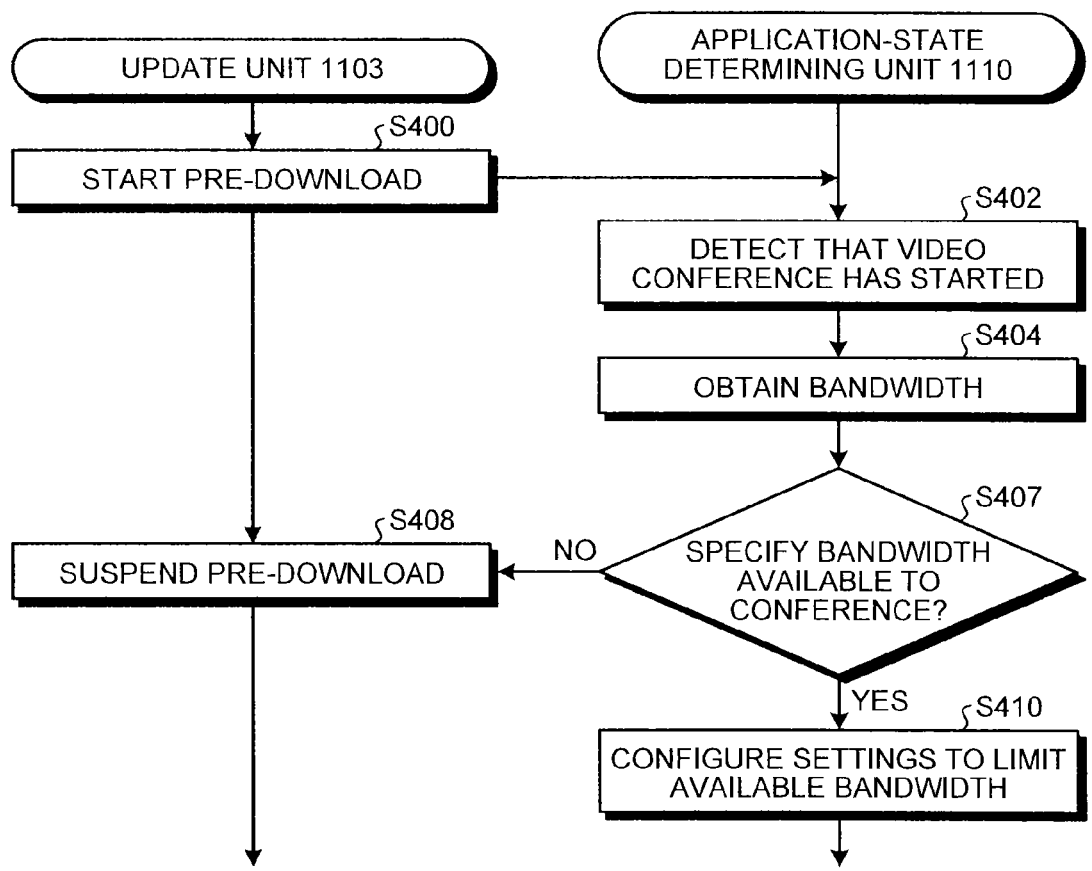
FIG. 20 is a flow ladder diagram illustrating a second modification of the operation of the application-state determining unit and the update unit in a situation where state of a video conference changes during the video conference.
FIG. 21 is a table (bandwidth table) of bandwidths necessary for video conference on a per-video-conference-mode basis.

A second modification of the operation of the application-state determining unit 1110 and the update unit 1103 in a situation where state of a video conference changes during the video conference is described below. In the second modification, the application-state determining unit 1110 specifies a maximum bandwidth available to a video conference based on the obtained available bandwidth and a bandwidth table of bandwidths necessary for video conferencing. FIG. 20 is a flow ladder diagram illustrating the second modification of the operation of the application-state determining unit 1110 and the update unit 1103 in a situation where state of a video conference changes during the video conference. FIG. 21 is a table (bandwidth table) of bandwidths necessary for video conference on a per-video-conference-mode basis. The bandwidth table illustrated in FIG. 21 may be stored in the ROM 102 or the RAM 103, for example. Repeated use of reference characters in the second modification illustrated in FIG. 20 is intended to represent substantially same steps of the first modification illustrated in FIG. 19.

The application-state determining unit 1110 determines, in accordance with settings defined by a user, whether or not to specify a necessary bandwidth (i.e., bandwidth available to a video conference) for each of video conference modes according to the bandwidth table illustrated in FIG. 21 (Step S407). More specifically, the application-state determining unit 1110 determines to specify a bandwidth available to a video conference if pre-download is continuable on condition that limitation is imposed on the bandwidth for the video conference in accordance with the settings defined by the user.

If the application-state determining unit 1110 determines not to specify a bandwidth available to the video conference (NO in Step S407), the application-state determining unit 1110 issues a command to suspend the pre-download to the update unit 1103. If the application-state determining unit 1110 determines to specify a bandwidth available to the video conference (YES in Step S407), the application-state determining unit 1110 configures settings so as to limit a bandwidth available to the video conference in accordance with the settings defined by the user (Step S410).

The application-state determining unit 1110 determines whether or not the video conference is continuable without suspending the pre-download on condition that limitation is imposed on the bandwidth available to the video conference as described above. If the application-state determining unit 1110 determines that the video conference is continuable without suspending the pre-download, the application-state determining unit 1110 configures settings so as to limit the bandwidth available to the video conference. When the settings are configured so as to limit the bandwidth by the application-state determining unit 1110, the update unit 1103 limits the bandwidth available to the video conference and causes the pre-download of update data to continue.

For instance, in a situation where a bandwidth available to a video conference is 400 kilobits per second (kbps) in the communication network 2, the video conference can be carried out in a narrow bandwidth mode without suspending pre-download. Therefore, if limitation is imposed on the bandwidth available to the video conference in accordance with the settings defined by the user, the pre-download is continuable. Accordingly, the application-state determining unit 1110 determines to specify the bandwidth available to the video conference, and configures settings so as to limit the available bandwidth. More specifically, the application-state determining unit 1110 configures the settings so as to limit the available bandwidth by changing resolution and parameters to those for video conferences in the narrow bandwidth mode. If the application-state determining unit 1110 determines that the bandwidth necessary to attain both of the functions (the pre-download and the video conference) cannot be obtained even if limitation is imposed on the bandwidth available to the video conference, the application-state determining unit 1110 issues a command to suspend the pre-download to the update unit 1103.

More specifically, the communication system 1 may be a TV phone system, a voice conference system, a voice phone system, a PC-screen sharing system, or a phone system such as an Internet protocol (IP) phone system or an Internet phone system. The communication system 1 may be a car navigation system. For instance, the communication system 1 may be configured such that one of the videophone terminals 11 corresponds to a car navigation device mounted on a vehicle, and another one of the videophone terminals 11 corresponds to a management terminal or a management server in a management center which manages car navigation, or a car navigation device mounted on another vehicle. The communication system 1 may be configured as a content distribution system which distributes video data which can be data of movies, TV programs, and contents uploaded on video sharing sites or digital data such as digital electronic books.

The communication management server 50 and the update server 60 of the embodiments described above may be implemented in a single computer or, alternatively, plural computers to which the units (functions or means) of the servers 50 and 60 are allocated as desired. If the update server 60 is implemented in a single computer, a program to be transmitted from the update server 60 may be divided into plural modules and transmitted separately or transmitted without being divided into modules. If the update server 60 is implemented in plural computers, the program to be transmitted from the update server 60 may be divided into plural modules and allocated to the computers so that the modules are transmitted from the computers.

According to an aspect of the embodiment, degradation in quality of data communication can be prevented.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus for receiving update data for an application, the application carrying out data communication of transferring data containing at least any one of video data and audio data over a network, and updating the application using the update data, the communication apparatus comprising:
    a network interface configured to receive related information that is information related to the update data; and
    processing circuitry configured to
        start downloading the update data based on the related information; and
        determine whether an execution state of the application is a start state in which data communication of transmitting data including at least one of the video data and the audio data is started or an end state in which the data communication is ended, wherein
    when the processing circuitry determines that the execution state of the application is the start state, the processing circuitry suspends the downloading of the update data, and
    when the processing circuitry determines that the execution state of the application is the end state, the processing circuitry starts again the downloading of the update data.

2. The communication apparatus according to claim 1, wherein when the processing circuitry determines that the execution state of the application is the start state, the processing circuitry further determines whether or not a bandwidth available to the network is lower than a threshold value having been set in advance for the data communication, and when the processing circuitry determines that the bandwidth available to the network is lower than the threshold value, the processing circuitry suspends the downloading of the update data.

3. The communication apparatus according to claim 1, further comprising a memory that stores therein bandwidth information indicating bandwidths necessary for the data communication using the application in associated with each mode of the data communication using the application,
    wherein when the processing circuitry determines that the execution state of the application is the start state, the processing circuitry further determines, based on the bandwidth information corresponding to the mode stored in the memory, whether or not the data communication is continuable without suspending the download on condition that a limitation is imposed on the bandwidth available to the data communication,
    when the processing circuitry determines that the data communication is not continuable, the processing circuitry suspends the downloading of the update data, and
    when the processing circuitry determines that the data communication is continuable, the processing circuitry does not suspend the downloading of the update data, but limits the bandwidth available to the data communication.

4. The communication apparatus according to claim 1, wherein the network interface is configured to receive the related information, which contains information indicating that the update data is pre-download data downloadable in advance of when the application is to be updated.

5. A communication system, comprising:
    a first communication apparatus configured to receive update data for an application, the application carrying out data communication of transferring data containing at least any one of video data and audio data over a network, and update the application using the update data; and
    a second communication apparatus configured to transmit the update data and related information, the related information being information related to the update data, to the first communication apparatus,
    the first communication apparatus including
        a network interface configured to receive the related information, and
        processing circuitry configured to
            start downloading the update data based on the related information, and
            determine whether an execution state of the application is a start state in which data communication of transmitting data including at least one of the video data and the audio data is started or an end state in which the data communication is ended, wherein
    when the processing circuitry determines that the execution state of the application is the start state, the processing circuitry suspends the downloading of the update data, and
    when the processing circuitry determines that the execution state of the application is the end state, the processing circuitry starts again the downloading of the update data.

6. The communication system according to claim 5, wherein when the processing circuitry determines that the execution state of the application is the start state, the processing circuitry further determines whether or not a bandwidth available to the network is lower than a threshold value having been set in advance for the data communication, and when the processing circuitry determines that the bandwidth available to the network is lower than the threshold value, the processing circuitry suspends the downloading of the update data.

7. The communication system according to claim 5, further comprising a memory that stores therein bandwidth information indicating bandwidths necessary for the data communication using the application in associated with each mode of the data communication using the application, wherein when the processing circuitry determines that the execution state of the application is the start state, the processing circuitry further determines, based on the bandwidth information corresponding to the mode stored in the memory, whether or not the data communication is continuable without suspending the download on condition that a limitation is imposed on the bandwidth available to the data communication, when the processing circuitry determines that the data communication is not continuable, the processing circuitry suspends the downloading of the update data, and when the processing circuitry determines that the data communication is continuable, the processing circuitry does not suspend the downloading of the update data, but limits the bandwidth available to the data communication.

8. The communication system according to claim 5, wherein the network interface is configured to receive the related information, which contains information indicating that the update data is pre-download data downloadable in advance of when the application is to be updated.

9. A communication method to be performed in a communication system including a first communication apparatus configured to receive update data for an application, the application carrying out data communication of transferring data containing at least any one of video data and audio data over a network, and update the application using the update data, and a second communication apparatus configured to transmit the update data and related information, the related information being information related to the update data, to the first communication apparatus, the communication method comprising:

receiving, by the first communication apparatus, the related information;

starting, by the first communication apparatus, downloading of the update data based on the related information;

determining whether an execution state of the application is a start state in which data communication of transmitting data including at least one of the video data and the audio data is started or an end state in which the data communication is ended;

when the determining step determines that the execution state of the application is the start state, suspending the downloading of the update data, and when the determining step determines that the execution state of the application is the end state, starting again the downloading of the update data.

10. The communication method according to claim 9, wherein the communication method further comprises:

when determining that the execution state of the application is the start state, determining, by the first communication apparatus, whether or not a bandwidth available to the network is lower than a threshold value having been set in advance for the data communication, and when determining that the bandwidth available to the network is lower than the threshold value, suspending the downloading of the update data.

11. The communication method according to claim 9, wherein the communication method further comprises:

storing bandwidth information indicating bandwidths necessary for the data communication using the application in associated with each mode of the data communication using the application;

when determining that the execution state of the application is the start state, determining, by the first communication apparatus, based on the stored bandwidth information corresponding to the mode, whether or not the data communication is continuable without suspending the download on condition that a limitation is imposed on the bandwidth available to the data communication, and when determining that the data communication is not continuable, suspending the downloading of the update data, and when determining that the data communication is continuable, not suspending the downloading of the update data, but limiting the bandwidth available to the data communication.

12. The communication method according to claim 9, wherein the related information contains information indicating that the update data is pre-download data downloadable in advance of when the application is to be updated.

13. The communication apparatus according to claim 1, wherein the application is an application for executing a video conference, the data communication by the video conference includes video data and audio data, and the start state is a start state of the video conference using the application for executing the video conference, and the end state is an end state of the video conference using the application for executing the video conference.

14. The communication apparatus of claim 2, wherein the processing circuitry is further configured to determine the bandwidth available to the network by determining a speed of communication being performed or by constant polling.

* * * * *